(12) United States Patent
Ren et al.

(10) Patent No.: US 11,428,630 B2
(45) Date of Patent: Aug. 30, 2022

(54) SYSTEM AND METHOD FOR DETERMINING SECOND ORDER NONLINEAR SUSCEPTIBILITY OF MATERIAL

(71) Applicant: NANKAI UNIVERSITY, Tianjin (CN)

(72) Inventors: Meng-Xin Ren, Tianjin (CN); Jun-Jun Ma, Tianjin (CN); Jia-Xin Chen, Tianjin (CN); Wei Wu, Tianjin (CN); Wei Cai, Tianjin (CN); Jing-Jun Xu, Tianjin (CN)

(73) Assignee: NANKAI UNIVERSITY, Tianjin (CN)

( * ) Notice: Subject to any disclaimer, the term of this patent is extended or adjusted under 35 U.S.C. 154(b) by 253 days.

(21) Appl. No.: 16/839,079

(22) Filed: Apr. 3, 2020

(65) Prior Publication Data
US 2021/0164902 A1   Jun. 3, 2021

(30) Foreign Application Priority Data
Dec. 2, 2019   (CN) .......................... 201911213678.7

(51) Int. Cl.
*G01N 21/63*   (2006.01)
*G02F 1/37*    (2006.01)
*G02F 1/35*    (2006.01)

(52) U.S. Cl.
CPC ......... *G01N 21/636* (2013.01); *G02F 1/3501* (2013.01); *G02F 1/37* (2013.01); *G02F 1/3503* (2021.01)

(58) Field of Classification Search
CPC ........ G02F 1/3501; G02F 1/3503; G02F 1/37; G01N 21/636
See application file for complete search history.

(56) References Cited

U.S. PATENT DOCUMENTS

2008/0049224 A1*   2/2008   Otsuki ................. G01N 21/211
                                                              356/370

FOREIGN PATENT DOCUMENTS

| CN | 1144906   A | * | 3/1997  | ............. G01B 11/06 |
|----|-------------|---|---------|--------------------------|
| CN | 1813174   A | * | 8/2006  | ................ G01J 3/02 |
| CN | 103134592 A | * | 6/2013  | ............. G01J 3/447 |
| CN | 108519335 A | * | 9/2018  | ........... G01N 21/211 |
| CN | 106517086 B | * | 10/2018 | ........... B82B 3/0085 |
| CN | 110456172 A | * | 11/2019 | ............. G01R 29/12 |

* cited by examiner

*Primary Examiner* — Daniel Petkovsek

(57) ABSTRACT

A system for determining a second-order nonlinear susceptibility of a material includes a laser light source, a polarization modulator, a light collector, a polarization detector and a controller. The controller can obtain the second-order nonlinear susceptibility of the sample to be tested according to the test data. The system for determining the second-order nonlinear susceptibility of a material can directly test a material (block or film) with a thickness of hundreds of nanometers, and draw a second-order nonlinear susceptibility fitting curve of the material according to the test results of the optical system.

14 Claims, 5 Drawing Sheets

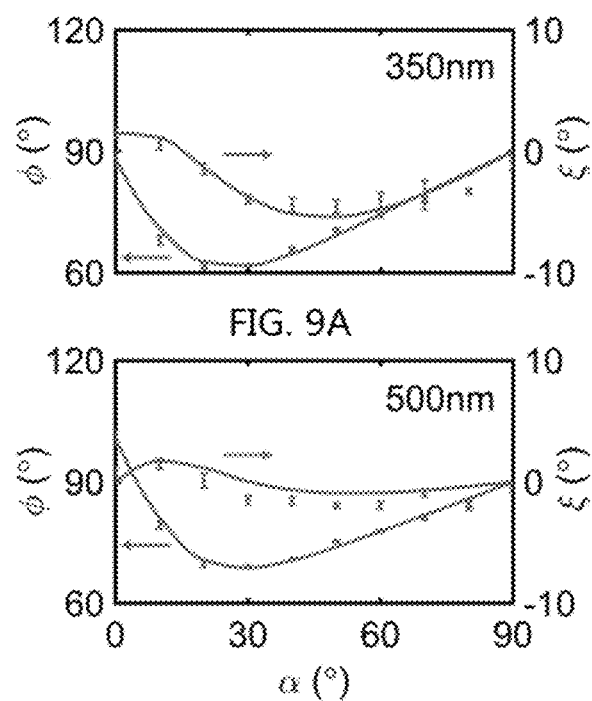
FIG. 9A
FIG. 9B
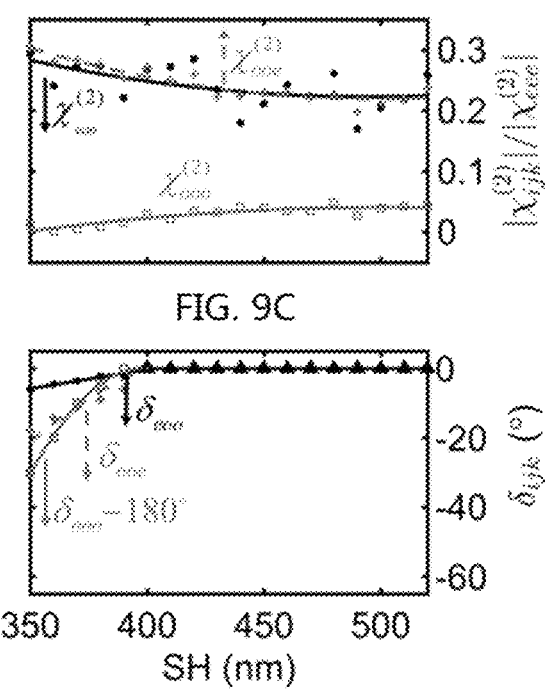
FIG. 9C
FIG. 9D

SYSTEM AND METHOD FOR DETERMINING SECOND ORDER NONLINEAR SUSCEPTIBILITY OF MATERIAL

CROSS REFERENCE TO RELATED APPLICATION

The present disclosure claims priority to China Patent Application No. 201911213678.7, entitled "System and Method for Determining Second-Order Nonlinear Susceptibility of Material," filed on Dec. 2, 2019, the content of which is expressly incorporated herein by reference in its entirety.

TECHNICAL FIELD

The present disclosure relates to the field of optical technology, and particularly to a system and a method for determining a second-order nonlinear susceptibility of a material.

BACKGROUND

In the optical technology field, the second-order nonlinear susceptibility of a material is always a very important test parameter. At present, there are multiple methods for measuring the second-order nonlinear susceptibility of a material, but a great error may exist in the measurements. For example, in a Maker fringes method, a laser beam at fundamental frequency is incident on a plate made of a nonlinear optical medium. The plate rotates around an axis perpendicular to the laser beam, which changes the incident angle of the fundamental frequency light, and varies phase mismatching periodically. As a result, intensity of frequency-doubled light (i.e. second harmonic) changes periodically, forming the Maker fringes. In another technique (called wedge technique), the laser is incident on a wedge-shaped nonlinear optical crystal. The crystal plate is translated, leading to the phase mismatch variation as a function of the varied sample thickness. The intensity of the second harmonic light changes as well, and the Maker fringes are formed. By solving the envelope function of the Maker fringes, the maximum value of the envelope function could be obtained, which is further normalized to a standard sample (such as potassium dihydrogen phosphate, KDP). In this way, the second-order nonlinear susceptibility can be measured. A ratio $d_r$ of the second-order nonlinear susceptibility of the sample to the second-order nonlinear susceptibility of the standard sample can be represented as:

$$d_r^2 = \left[\frac{I_c^{(KDP)}}{l_c}\right]^2 \frac{I}{I(KDP)} R.$$

Where, $I_c^{(KDP)}$ and $l_c$ represent coherent lengths of the standard sample and the sample to be tested, respectively. I (KDP) is the maximum value of the envelope function of the Maker fringes of the standard sample. I is the maximum value of the envelope function of the Maker fringes of the sample to be tested. R is a parameter related to the refractive index. Thus, in order to measure the second-order nonlinear susceptibility using the Maker fringes method, it is necessary to firstly obtain the Marker fringes of the sample in the experiment, then calculate the maximum value of the envelope function of the Maker fringes, and finally replace the formula with the maximum value to obtain the solution.

Another example for measuring the second-order nonlinear susceptibility is the Kurtz powder technology, which is a simple, fast, but with semi-quantification, and low precision. In the operation of the measurement using the Kurtz powder technology, the sample to be tested is grinded into powder with uniform size and a particle radius r. A sample box with a volume V is filled with the powder, then the laser excites the second harmonics from the powder, whose intensity is recorded. By comparing the intensity from the samples to be tested with the results of the standard sample powder (such as KDP powder), the second-order nonlinear magnetic susceptibility could be obtained. A ratio $d_r$ between the results of the sample and the standard can be represented as:

$$d_r = \frac{I}{I(KDP)}.$$

Where I (KDP) and I respectively represent the light intensities of the frequency-doubled light of the standard sample and the sample to be tested, respectively. It should be noted that the size of the powders of the standard sample should be consistent with the powder of the sample to be tested.

The Kurtz powder technology has relatively low accuracy, but can qualitatively determine the frequency-doubled light characteristic of the sample. By analyzing the relationship between the size of the powder radius and the light intensity of the frequency-doubled light, the sample can be divided into three categories: (1) sample without frequency-doubled light characteristic: no frequency-doubled light signal; (2) phase-matching sample: light intensity of the frequency-doubled light increases with the particle radius and eventually remains constant; (3) non-phase-matching sample: the light intensity of the frequency-doubled light first increases with the particle radius and then decreases.

Another example is the efficiency measurement method. Efficiency measurement method uses the analytical mode to substitute the conversion efficiency of the frequency-doubled light obtained by experiments into the following analytic formula to calculate the second-order nonlinear susceptibility. For the fundamental-mode Gaussian beam, the efficiency of the excitation of the frequency-doubled light is expressed as:

$$\eta = \frac{P_2}{P_1} = \frac{8\pi \chi^{(2)}}{n_1^2 n_2 \lambda_1^2 c \varepsilon_0} I \frac{\sin^2(\Delta k l/2)}{(\Delta k l/2)^2}.$$

Where, $n_1$ is the refractive index of the material corresponding to the fundamental frequency light, $n_2$ is the refractive index corresponding to the frequency-doubled light, $\lambda_1$ is the wavelength of fundamental frequency light, c is the velocity of light in vacuum, $\varepsilon_0$ is the vacuum dielectric constant, $\Delta k$ is a wave vector mismatch, l is the crystal length, I is the excitation light intensity, $\chi^{(2)}$ is the second-order nonlinear susceptibility to be determined. In principle, the second-order nonlinear susceptibility can be obtained as long as the conversion efficiency of the frequency-doubled light, the crystal length l and the excitation light intensity I are measured. However, if the measurement error in the crystal length is close to that of the coherent length of the second harmonic, a large error in $\chi^{(2)}$ may be caused.

In conclusion, the conventional methods for measuring the second-order nonlinear susceptibility of the material have great errors, and there is no comprehensive method for measuring the second-order nonlinear susceptibility at present

SUMMARY

In view of this, it is necessary to provide a system and a method to determine the second-order nonlinear susceptibility of a material.

In an embodiment, an optical system is provided, including:

a laser light source, configured to generate a fundamental frequency light;

a polarization modulator, configured to receive and polarize the fundamental frequency light, output a linearly polarized fundamental frequency light and make the linearly polarized fundamental frequency light irradiate the sample to be tested to generate a frequency-doubled light;

a light collector, configured to collect the linearly polarized fundamental frequency light and the frequency-doubled light, and filter out the linearly polarized fundamental frequency light, and output the frequency-doubled light; and a polarization detector, configured to detect the polarization state and the intensity of the frequency-doubled light, and the polarization state comprises the polarization azimuth angle and the ellipticity angle of the light.

In an embodiment, a system for determining a second-order nonlinear susceptibility of a material is provided, including:

a laser light source, configured to generate a fundamental frequency light;

a polarization modulator, configured to receive and polarize the fundamental frequency light, output a linearly polarized fundamental frequency light, and make the linearly polarized fundamental frequency light irradiate the sample to be tested to generate frequency-doubled light;

a light collector, configured to collect the linearly polarized fundamental frequency light and the frequency-doubled light and filter out linearly polarized the fundamental frequency light to output the frequency-doubled light; and a polarization detector, configured to detect the polarization state and the light intensity of the frequency-doubled light, the polarization state comprising the polarization azimuth angle and the ellipticity angle of frequency-doubled light; and a controller, which is connected to the laser light source, the polarization modulator, the light collector and the polarization detector, and configured to perform multiple sets of optical tests on the sample to be tested, and each set of optical tests resulting in a set of test data. The controller is used to obtain the second-order nonlinear susceptibility of the sample to be tested according to the test data. This set of test data includes the light intensity of the fundamental frequency light, the polarization azimuth angle of the fundamental frequency light, the polarization azimuth angle of the frequency-doubled light, the ellipticity angle of the frequency-doubled light, and the light intensity of the frequency-doubled light.

A method for determining the second-order nonlinear susceptibility of a material, applied to the system of the above embodiment, including:

step S100: providing a sample to be tested, determining a cut direction and the thickness of the sample to be tested;

step S200: performing, by the system, multiple sets of optical tests on the sample to be tested, recording experimental values of a light intensity and a polarization azimuth angle of the fundamental frequency light employed in each set of optical tests, and simultaneously recording the experimental values of a light intensity, a polarization azimuth angle, and an ellipticity angle of the frequency-doubled light generated by exciting the sample to be tested in each set of optical tests;

step S300: inputting one or more of following parameters into an optical parameter simulation calculation module:

the cut direction of the sample to be tested, the thickness of the sample to be tested, the experimental value of the light intensity of the fundamental frequency light employed in each set of optical tests, the experimental value of the polarization azimuth angle of fundamental frequency light employed in each set of optical tests, the experimental value of the light intensity of frequency-doubled light obtained in each set of optical tests, the experimental value of the polarization azimuth angle of frequency-doubled light obtained in each set of optical tests, the experimental value of the ellipticity angle of frequency-doubled light obtained in each set of optical tests, and the susceptibility trial solution given to each set of optical tests;

step S400: performing, by the optical parameter simulation calculation module, a fitting calculation to form a second-order nonlinear susceptibility fitting curve of the material, and obtaining the second-order nonlinear susceptibility of the material from the second-order nonlinear susceptibility fitting curve.

The present disclosure provides a system and method for determining the second-order nonlinear susceptibility of a material. The system includes a laser light source, a polarization modulator, a light collector, a polarization detector, and a controller. The controller can obtain the second-order nonlinear susceptibility of the sample to be tested according to the test data. The system can directly test the material (e.g., a block or a film) with a thickness of hundreds of nanometers, and draw a second-order nonlinear susceptibility fitting curve of the material according to the experimental results of the optical system. Furthermore, the system can obtain a ratio relationship and a phase relationship between different second-order nonlinear polarization parameters through the second-order nonlinear susceptibility fitting curve of the material, thereby avoiding multiple measurements of the absolute efficiency.

BRIEF DESCRIPTION OF DRAWINGS

FIG. 9A shows the dependence of a polarization state of a frequency-doubled light having a wavelength of 350 nm on a polarization azimuth angle of a fundamental frequency light.

FIG. 9B shows the dependence of a polarization state of a frequency-doubled light having a wavelength of 500 nm on a polarization azimuth angle of a fundamental frequency light.

FIG. 9C and FIG. 9D respectively show second-order nonlinear susceptibility simulation curves of a material obtained by fitting and solving via an optical parameter simulation calculation module according to the present embodiment.

DETAILED DESCRIPTION

The disclosure is detailed through embodiments with reference to accompanying drawings to clarify the objectives, technical solutions, and advantages. It should be understood that the specific embodiments described herein are merely used for explaining the present disclosure, and are not intended to limit the present disclosure.

Figure 1:
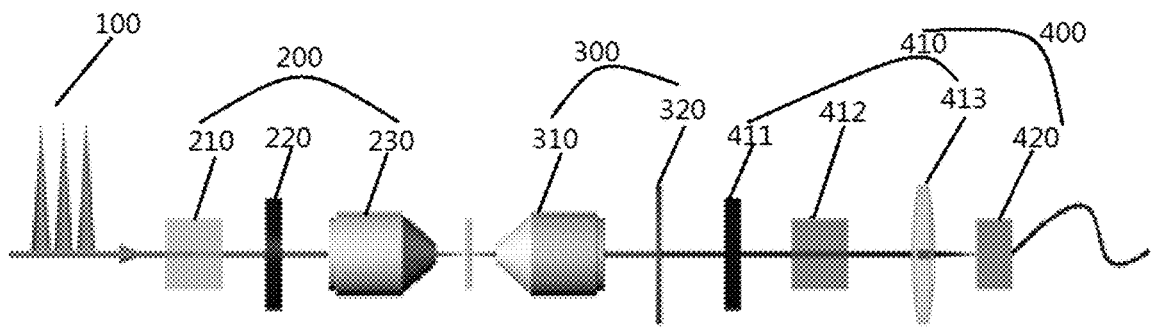
FIG. 1 is a schematic structural view of an optical system according to an embodiment of the present disclosure.

Referring to FIG. 1, the present disclosure provides an optical system 10 including a laser light source 100, a polarization modulator 200, a light collector 300, and a polarization detector 400.

The laser light source 100 is configured to produce fundamental frequency light, and the wavelength of fundamental light is adjustable. Specifically, the laser light source 100 can be a tunable laser. The light output direction of the laser light source 100 is related to the positions of other devices in the optical system 10.

The polarization modulator 200 is arranged between the laser light source 100 and the sample to be tested. The polarization modulator 200 acts on the fundamental frequency light to generate fundamental frequency light and irradiates the sample to be tested with the fundamental frequency light. The fundamental frequency light excites the sample to be tested to produce frequency-doubled light. The polarization azimuth angle of the fundamental frequency light is adjustable. The polarization modulator 200 can adjust the optical parameters of the fundamental frequency light such that the sample to be tested can be excited by different types of fundamental frequency light.

The light collector 300 is arranged on one side of the sample to be tested on which the sample to be tested is excited to produce the frequency-doubled light. The light collector 300 collects the light transmitted by the sample to be tested. The light transmitted by the sample to be tested includes the fundamental frequency light and the frequency-doubled light. The light collector 300 filters out the fundamental frequency light. The light collector 300 can include a plurality of optical devices.

The polarization detector 400 is configured to detect the polarization state of frequency-doubled light and the light intensity of frequency-doubled light. The polarization state includes the polarization azimuth angle and the ellipticity angle of frequency-doubled light. The polarization detector 400 can also include a plurality of optical devices. The specific position of the polarization detector 400 depends on the direction of propagation of the frequency-doubled light.

In the present embodiment, the positions of the laser light source 100, the polarization modulator 200, the light collector 300, and the polarization detector 400 are not limited as long as the test of optical parameters of the sample to be tested can be implemented. In the present embodiment, the optical system 10 can test a material with any thickness (e.g., block or film), but the thickness of the sample is required to be accurate. The higher the thickness accuracy, the smaller the error of the test results. The optical system 10 can avoid the error caused by the case where the measurement error of the thickness is equivalent to the coherent length of the frequency-doubled light of the sample to be tested. The optical system 10 can be widely applied to the measurement of the second-order nonlinear susceptibility of materials, so as to implement a simple system and test the second-order nonlinear susceptibility with high accuracy.

In an embodiment, the polarization modulator 200 includes a first prism 210, a half-wave plate 220 and a first multi-magnification objective lens 230.

The first prism 210 can be a Gran-Taylor prism, arranged between the laser light source 100 and the sample to be tested, and configured to convert the fundamental frequency light generated by the laser light source 100 into linearly polarized light.

The half-wave plate 220 is arranged between the first prism 210 and the sample to be tested. The half-wave plate 220 is configured to adjust a polarization azimuth angle of the linearly polarized light.

The first multi-magnification objective lens 230 can be a five-magnification objective lens, a ten-magnification objective lens, a twenty-magnification objective lens, a thirty-magnification objective lens, a forty-magnification objective lens, or an objective lens with larger magnification. The first multi-magnification objective lens 230 is arranged between the half-wave plate 220 and the sample to be tested, and is configured to focus the linearly polarized light on the sample to be tested.

In the present embodiment, the polarization modulator 200 includes the first prism 210, the half-wave plate 220, and the first multi-magnification objective lens 230. Of course, the polarization modulator 200 can also be composed of other optical components. Meanwhile, the position relationship of the optical components in the polarization modulator 200 is not limited as long as the propagation of light can be implemented.

In an embodiment, the light collector 300 includes a second multi-magnification objective lens 310 and a color filter 320.

Specifically, the second multi-magnification objective lens 310 can be a five-magnification objective lens, a ten-magnification objective lens, a twenty-magnification objective lens, a thirty-magnification objective lens, a forty-magnification objective lens, a sixty-magnification objective lens, or an objective lens with larger magnification. The second multi-magnification objective lens 310 is arranged on one side of the sample to be tested on which the sample to be tested is excited to produce the frequency-doubled light, and is configured to collect light transmitted by the sample to be tested.

The color filter 320 is arranged between the second multi-magnification objective lens 310 and the polarization detector 400, and is configured to filter out the linearly polarized fundamental frequency light and transmit the frequency-doubled light to the polarization detector 400.

In the present embodiment, the light collector 300 includes the second multi-magnification objective lens 310 and the color filter 320. Of course, the light collector 300 can also be composed of other optical components. At the same time, the position relationship of the light collector 300 is not limited as long as the collection of the frequency-doubled light can be implemented.

In an embodiment, the polarization detector 400 includes a compound lens 410 and a signal detector 420.

The compound lens 410 is arranged on one side of the color filter 320 on which the fundamental frequency light is filtered out by the color filter 320, and is configured to analyze and focus the frequency-doubled light signal. The signal detector 420 is arranged on one side of the compound lens 410 on which the polarization state of the frequency-doubled light signal focused by the compound lens 410 is analyzed. The signal detector 420 is configured to acquire the polarization azimuth angle, the ellipticity angle and the light intensity of the frequency-doubled light.

In the present embodiment, the polarization detector 400 includes the compound lens 410 and the signal detector 420. Of course, the polarization detector 400 can also be composed of other optical components. At the same time, the position relationship of the polarization detector 400 is not limited, as long as the optical parameters such as the polarization azimuth angle, the ellipticity angle and intensity of the frequency-doubled light can be detected.

In an embodiment, the compound lens 410 includes a quarter-wave plate 411, a second prism 412 (the second prism can be a Gran-Taylor prism) and a convex lens 413. The quarter-wave plate 411, the second prism 412 and the convex lens 413 are arranged in sequence according to the propagation direction of the light. The quarter-wave plate 411 and the second prism 412 constitute an analyzer, and are jointly configured to detect the polarization state of the frequency-doubled light (e.g., whether the light has been polarized or not). The convex lens 413 is configured to focus the frequency-doubled light.

In an embodiment, the sample to be tested is any one of the x-cut sample, y-cut sample or z-cut sample. In an embodiment, the sample to be tested is a film or a block. For example, the sample to be tested can be a nonlinear crystal sample with a flat surface, such as a lithium niobate film with a thickness of 200 nm, a barium metaborate (BBO) block or film, a potassium dihydrogen phosphate (KDP) block or film.

Figure 2:
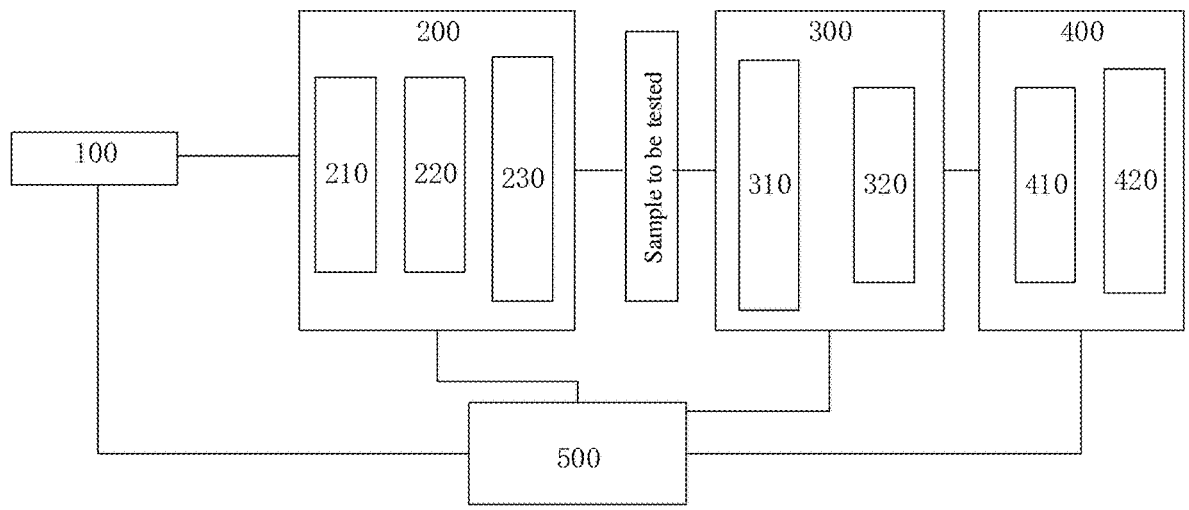
FIG. 2 is a schematic structural view of a system for determining a second-order nonlinear susceptibility of a material according to an embodiment of the present disclosure.

Referring to FIG. 2, the present disclosure further provides a system 20 for determining the second-order nonlinear susceptibility of a material, including the laser light source 100, the polarization modulator 200, the light collector 300, the polarization detector 400, and a controller 500.

The controller 500 is connected to the laser light source 100, the polarization modulator 200, the light collector 300 and the polarization detector 400 respectively. The controller 500 is configured to perform multiple tests on the sample to be tested, each test resulting in a set of test data, and obtain the second-order nonlinear susceptibility of the sample to be tested according to the test data. The set of test data includes the light intensity of the fundamental frequency light, the polarization azimuth angle of the fundamental frequency light, the polarization azimuth angle of the frequency-doubled light, the ellipticity angle of the frequency-doubled light and the light intensity of the frequency-doubled light.

Specifically, the controller 500 is connected to the laser light source 100 and the polarization modulator 200 respectively, and is configured to obtain the light intensity of the fundamental frequency light and the polarization azimuth angle of the fundamental frequency light. The controller 500 is connected to the light collector 300 and the polarization detector 400 respectively, and is configured to obtain the polarization state and the light intensity of the frequency-doubled light.

In the present embodiment, the controller 500 can obtain the second-order nonlinear susceptibility of the sample to be tested according to the test data. The system 20 for determining the second-order nonlinear susceptibility of a material is not only capable of directly testing the material (such as a block or a film) with a thickness of hundreds of nanometers, but also capable of drawing a second-order nonlinear susceptibility fitting curve of the material according to the test results of the optical system 10. Furthermore, the system 20 for determining the second-order nonlinear susceptibility of a material can obtain a ratio relationship and phase relationship between different second-order nonlinear susceptibility parameters by the second-order nonlinear susceptibility fitting curve of the material, thus avoiding multiple measurements of the absolute efficiency.

In an embodiment, the controller 500 includes an optical parameter simulation calculation module, which can implement the simulation calculation of optical parameters based on the finite element method or the finite-difference time-domain method in combination with Maxwell equations.

The optical parameter simulation calculation module can perform the simulation calculation based on the finite element method. The optical parameter simulation calculation module can perform the simulation calculation based on the finite-difference time-domain method. Of course, it is appreciated that the optical parameter simulation calculation module can implement the simulation calculation by other simulation algorithms. When other simulation algorithms are employed, the input into the module still includes one or more of the following: the cut direction of the sample to be tested, the thickness of the sample to be tested, the experimental value of each set of light intensity of the fundamental light, the experimental value of each set of polarization azimuth angle of the fundamental light, the experimental value of each set of light intensity of the frequency-doubled light, the experimental value of each set of polarization azimuth angle of the frequency-doubled light, the experimental value of each set of ellipticity angle of the frequency-doubled light, and each set of susceptibility trial solutions. When other simulation algorithms are employed, the output of the module still includes the second-order nonlinear susceptibility fitting curve of the material, the ratio of absolute values of second-order nonlinear susceptibilities of the material, or the phase relationship between second-order nonlinear susceptibilities of the material.

Figure 3:
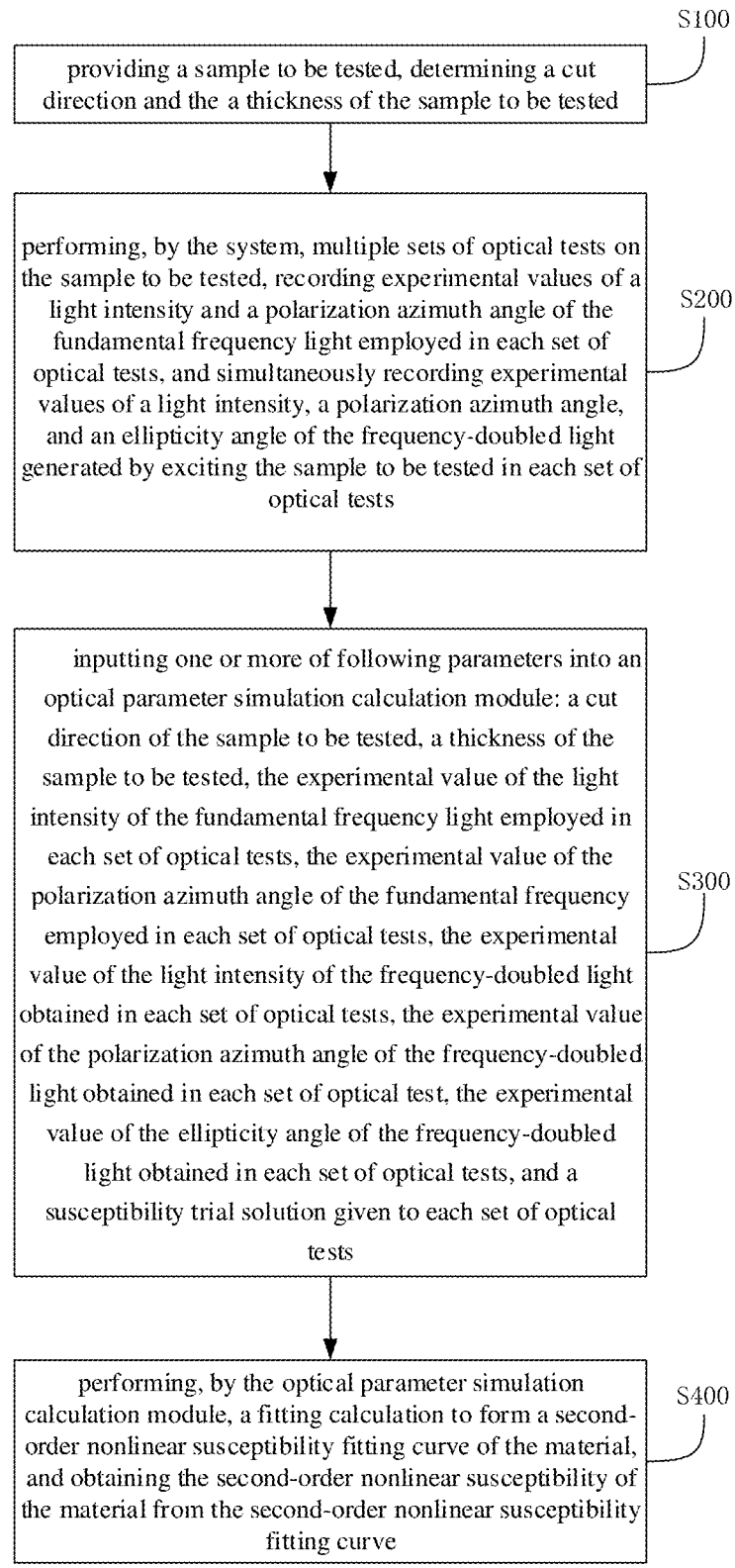
FIG. 3 is a flow chart showing a method for determining a second-order nonlinear susceptibility of a material according to an embodiment of the present disclosure.

Referring to FIG. 3, the present disclosure further provides a method for determining a second-order nonlinear susceptibility of a material, which includes the following steps.

Step S100: a sample to be tested is provided, and a cut direction and a thickness of the sample to be tested are determined.

The sample to be tested in the present step can be a film, a block, or other shapes of a solid material. The thickness of the sample to be tested ranges from 10 nm to 20 mm. In an embodiment, the thickness of the sample to be tested ranges from 100 nm to 800 nm. The thickness of the sample to be tested has an effect on the establishment of a subsequent optical parameter simulation calculation module. In the optical parameter simulation calculation module, the thickness of the sample film of 200 nm to be tested can be accurate to a few nanometers.

Step S200: a system 20 (as shown in FIG. 2) for determining the second-order nonlinear susceptibility of a material according to any one of the above embodiments is employed to perform multiple sets of optical tests on the sample to be tested, and each set of the optical tests is recorded. A light intensity experimental value and a polarization azimuth angle experimental value of fundamental light employed in each set of the optical tests are recorded; meanwhile, the light intensity experimental value, the polarization azimuth angle experimental value, and the ellipticity angle experimental value of frequency-doubled light generated by exciting the sample to be tested in each set of the optical tests are recorded.

In the present step, the five kinds of experimental values recorded are configured to establish the basic test curve, which can guide the establishment of a subsequent second-order nonlinear susceptibility fitting curve of the material. In this step, the five kinds of experimental values recorded can also be configured to verify whether an error of the subsequent second-order nonlinear susceptibility fitting curve of the material is in an appropriate range.

Step S300: the cut direction of the sample to be tested, the thickness of the sample to be tested, the experimental values of each set of light intensity of the fundamental light, the experimental values of each set of polarization azimuth angle of the fundamental light, the experimental values of each set of light intensity of the frequency-doubled light, the experimental values of each set of polarization azimuth angle of the frequency-doubled light, the experimental values of each set of ellipticity angle of the frequency-doubled light and each set of susceptibility trial solutions are input into the optical parameter simulation calculation module.

In the present step, the susceptibility trial solutions are obtained by combining empirical values and further using any one of the least square methods, singular value decomposition method, Monte Carlo method, and Tikhnow. The susceptibility trial solution can be iterated many times. In different cut types of samples to be tested, the types of susceptibility trial solutions are different, and the specific types of the susceptibility trial solutions can be obtained according to reasonable inference.

Step S400: the optical parameter simulation calculation module performs a fitting calculation to form a second-order nonlinear susceptibility fitting curve of the material, and the second-order nonlinear susceptibility of the material is obtained from the second-order nonlinear susceptibility fitting curve of the material.

In the present step, the optical parameter simulation calculation module implements the simulation calculation of the optical parameters based on the finite element method or finite-difference time-domain method in combination with Maxwell equations. The second-order nonlinear susceptibility of the material is obtained from the second-order nonlinear susceptibility fitting curve of the material. The second-order nonlinear susceptibility of the material includes a variety of different susceptibility parameters, the ratio relationship between different susceptibility parameters and the phase relationship between different susceptibility parameters.

In the method for determining the second-order nonlinear susceptibility of a material provided in the embodiment of the present disclosure, the optical parameter simulation module is employed to calculate the second-order nonlinear susceptibility, accordingly the result is more accurate. The method for determining the second-order nonlinear susceptibility of the material described in the present disclosure can reduce the complex problems in the actual experiments such as film interference and birefringent effect, etc. Through the method for determining the second-order nonlinear susceptibility of the material, the thickness can be accurately measured up to 0.1 nm by using the existing measuring technique. In the method for determining the second-order nonlinear susceptibility of the material, there is no need to compare the measurement error of the sample thickness to the coherent length of the frequency-doubled light of the sample; thus, the method for determining the second-order nonlinear susceptibility of the material of the present disclosure does not result in an unnecessary error. Through the method for determining the second-order nonlinear susceptibility of the material of the present disclosure, the absolute value of the second-order nonlinear susceptibility can be measured and the phase relationship between the second-order nonlinear susceptibilities can be obtained based on the polarization information of the frequency-doubled light, which are more conducive to the analysis of the properties of the sample to be tested.

In an embodiment, the method for determining the second-order nonlinear susceptibility of a material further includes the follow steps.

A second-order nonlinear susceptibility experiment curve of the material is obtained according to the experimental values of each set of light intensity of the fundamental light, the experimental values of each set of polarization azimuth angle of the fundamental light, the experimental values of each set of light intensity of the frequency-doubled light, the experimental values of each set of polarization azimuth angle of the frequency-doubled light, and the experimental values of each set of ellipticity angle of the frequency-doubled light;

It is determined whether an error of the second-order nonlinear susceptibility fitting curve of the material is within a preset error range from 0.5% to 5%. Optionally, the error is 1%, 1.2%, 1.8%, 2.4%, or 3.8%.

In the present step, the error of the second-order nonlinear susceptibility fitting curve of the material is equal to I simulation efficiency—experiment efficiency I/experiment efficiency *100%. Where, the fitting efficiency is a ratio of the frequency-doubled light power of a fitting point to a fundamental frequency light power of the fitting point, and the fitting point is taken from the second-order nonlinear susceptibility fitting curve of the material. The experimental efficiency is a ratio of a frequency-doubled light power of an experimental point to a fundamental frequency light power of the experimental point, and the experimental point is taken from the second-order nonlinear susceptibility experimental curve of the material. A light power is equal to a light intensity times a light spot area.

If the error of the second-order nonlinear susceptibility fitting curve of the material is not within the preset error range, the susceptibility trial solution is adjusted to correct the second-order nonlinear susceptibility fitting curve of the material.

In the present step, if the error of the second-order nonlinear susceptibility fitting curve of the material is within the preset error range, the second-order nonlinear susceptibility fitting curve of the material is qualified, and the correct and reasonable ratio relationship and phase relationship between the susceptibility parameters can be obtained. If the error of the second-order nonlinear susceptibility fitting curve of the material is not within the preset error range, the susceptibility trial solution is adjusted to correct the second-order nonlinear susceptibility fitting curve of the material. In the specific correction step, the value of the iterative operation for the susceptibility trial solution is adjusted until the calculated error of the second-order nonlinear susceptibility fitting curve of the material is in the preset error range.

In an embodiment, in the method for determining the second-order nonlinear susceptibility of the material, the second-order nonlinear susceptibility of the material at most includes 27 susceptibility parameters. In details, please refer to the description of the 27 susceptibility parameters as below. The second-order nonlinear susceptibility of the material includes the ratio relationship between the susceptibility parameters and the phase relationship between the susceptibility parameters. For detail, please refer to the ratio relationship or phase relationship given in step S440, S441 and S441 as below.

In an embodiment, the optical parameter simulation calculation module calculates the second-order nonlinear susceptibility $\chi_{ijk}^{(2)}$ of the material according to a calculation formula (1) of a second-order nonlinear polarization intensity of the nonlinear crystal:

$$P_i^{(2)} = \varepsilon_0 \Sigma_{jk} \chi_{ijk}^{(2)} E_j E_k \quad (1)$$

Where, subscripts i, j and k are respectively Cartesian coordinate components; $P_i^{(2)}$ is the i-component of the second-order nonlinear polarization intensity, which determines the generation of the i-polarization component of the frequency-doubled light; $E_j$ is the j-polarization component of the fundamental frequency light; $E_k$ is the k-polarization component of the fundamental frequency light; $\varepsilon_0$ is the vacuum dielectric constant, which is equal to $8.85 \times 10^{-12}$ F/m.

In the present embodiment, according to the formula (1): $P_i^{(2)} = \varepsilon_0 \Sigma_{jk} \chi_{ijk}^{(2)} E_j E_k$, twenty-seven second-order nonlinear polarization parameters $\chi_{ijk}^{(2)}$ can be obtained as follows:

$\chi_{xxx}^{(2)}$, $\chi_{xyy}^{(2)}$, $\chi_{xzz}^{(2)}$, $\chi_{xyz}^{(2)}$, $\chi_{xzx}^{(2)}$, $\chi_{xxy}^{(2)}$, $\chi_{xzy}^{(2)}$, $\chi_{xxz}^{(2)}$, $\chi_{xyx}^{(2)}$, $\chi_{xzx}^{(2)}$, $\chi$hd zyy$^{(2)}$, $\chi_{zzz}^{(2)}$, $\chi_{zyz}^{(2)}$, $\chi_{zzx}^{(2)}$, $\chi_{zxy}^{(2)}$, $\chi_{zzy}^{(2)}$, $\chi_{zxz}^{(2)}$, $\chi_{zyx}^{(2)}$, $\chi_{yxx}^{(2)}$, $\chi_{yyy}^{(2)}$, $\chi_{yzz}^{(2)}$, $\chi_{yyz}^{(2)}$, $\chi_{yzx}^{(2)}$, $\chi_{yxy}^{(2)}$, $\chi_{yzy}^{(2)}$, $\chi_{yxz}^{(2)}$, $\chi_{yyx}^{(2)}$.

Since the last two subscripts representing the polarization components of the incident fundamental frequency light have permutation invariability. That is, the parameter properties remain unchanged if the positions of these two subscripts are interchanged, i.e., the equations yz=zy, xy=yx, and zx=xz hold, thus, the twenty-seven elements of the second-order nonlinear susceptibility can be simplified into eighteen independent elements. The twenty-seven second-order nonlinear polarization parameters can be converted into eighteen independent second-order nonlinear polarization parameters according to the permutation invariability.

In an embodiment, the formula $P_i^{(2)} = \varepsilon_0 \Sigma_{jk} \chi_{ijk}^{(2)} E_j E_k$ is transformed into the following matrix representation:

$$\begin{bmatrix} P_x^{(2)} \\ P_y^{(2)} \\ P_z^{(2)} \end{bmatrix} = \varepsilon_0 \begin{pmatrix} \chi_{xxx}^{(2)} & \chi_{xyy}^{(2)} & \chi_{xzz}^{(2)} & \chi_{xyz}^{(2)} & \chi_{xzx}^{(2)} & \chi_{xxy}^{(2)} \\ \chi_{yxx}^{(2)} & \chi_{yyy}^{(2)} & \chi_{yzz}^{(2)} & \chi_{yyz}^{(2)} & \chi_{yzx}^{(2)} & \chi_{yxy}^{(2)} \\ \chi_{zxx}^{(2)} & \chi_{zyy}^{(2)} & \chi_{zzz}^{(2)} & \chi_{zyz}^{(2)} & \chi_{zzx}^{(2)} & \chi_{zxy}^{(2)} \end{pmatrix} \begin{bmatrix} E_x E_x \\ E_y E_y \\ E_z E_z \\ 2 E_y E_z \\ 2 E_z E_x \\ 2 E_x E_y \end{bmatrix} \quad \text{matrix (1)}$$

Where, x,y,z respectively denote the coordinate components of i,j,k in the Cartesian coordinate system; $\chi_{zxx}^{(2)}$, $\chi_{zyy}^{(2)}$, $\chi_{zzz}^{(2)}$, $\chi_{zyz}^{(2)}$, $\chi_{zzx}^{(2)}$, $\chi_{zxy}^{(2)}$, $\chi_{yxx}^{(2)}$, $\chi_{yyy}^{(2)}$, $\chi_{yzz}^{(2)}$, $\chi_{yyz}^{(2)}$, $\chi_{yzx}^{(2)}$, $\chi_{yxy}^{(2)}$, $\chi_{xxx}^{(2)}$, $\chi_{xyy}^{(2)}$, $\chi_{xzz}^{(2)}$, $\chi_{xyz}^{(2)}$, $\chi_{xzx}^{(2)}$, $\chi_{xxy}^{(2)}$, are eighteen independent polarization parameters; $P_x^{(2)}$ is x-component of the second-order nonlinear polarization intensity, which determines the generation of x-polarization component of the frequency-doubled light; $P_y^{(2)}$ is y-component of the second-order nonlinear polarization intensity, which determines the generation of y-polarization component of the frequency-doubled light; $P_z^{(2)}$ is z-component of the second-order nonlinear polarization intensity, which determines the generation of z-polarization component of the frequency-doubled light; $E_x$ is x-polarization component of the fundamental frequency light, $E_y$ is y-polarization component of the fundamental frequency light, $E_z$ is z-polarization component of the fundamental frequency light. $\varepsilon_0$ is the vacuum dielectric constant and is equal to $8.85 \times 10^{-12}$ F/m.

In an embodiment, the cut direction of the sample to be tested is x-cut direction, the thickness direction of the sample to be tested is x-direction, the direction of light propagation is x-direction, y-direction and z-direction are polarization directions.

The linearly polarized fundamental frequency light is incident on the surface of the sample to be tested and is transmitted along the x-axis, this moment only y and z polarization components of fundamental frequency light exist, and the matrix transformation is provided as follows:

$$\begin{bmatrix} P_x^{(2)} \\ P_y^{(2)} \\ P_z^{(2)} \end{bmatrix} = \varepsilon_0 \begin{pmatrix} \chi_{xxx}^{(2)} & \chi_{xyy}^{(2)} & \chi_{xzz}^{(2)} & \chi_{xyz}^{(2)} & \chi_{xzx}^{(2)} & \chi_{xxy}^{(2)} \\ \chi_{yxx}^{(2)} & \chi_{yyy}^{(2)} & \chi_{yzz}^{(2)} & \chi_{yyz}^{(2)} & \chi_{yzx}^{(2)} & \chi_{yxy}^{(2)} \\ \chi_{zxx}^{(2)} & \chi_{zyy}^{(2)} & \chi_{zzz}^{(2)} & \chi_{zyz}^{(2)} & \chi_{zzx}^{(2)} & \chi_{zxy}^{(2)} \end{pmatrix} \begin{bmatrix} 0 \\ E_y E_y \\ E_z E_z \\ 2 E_y E_z \\ 0 \\ 0 \end{bmatrix} \quad \text{matrix (1-1)}$$

The matrix (1-1) can be transformed into the following equations:

$$\begin{cases} P_x^{(2)} = \chi_{xyy}^{(2)} E_y E_y + \chi_{xzz}^{(2)} E_z E_z + 2 \chi_{xyz}^{(2)} E_y E_z \\ P_y^{(2)} = \chi_{yyy}^{(2)} E_y E_y + \chi_{yzz}^{(2)} E_z E_z + 2 \chi_{yyz}^{(2)} E_y E_z \\ P_z^{(2)} = \chi_{zyy}^{(2)} E_y E_y + \chi_{zzz}^{(2)} E_z E_z + 2 \chi_{zyz}^{(2)} E_y E_z \end{cases}$$

The step S300 includes the following steps.

Step S310: when only the y-polarization component of the fundamental frequency light is incident, experimental values of the susceptibility trial solutions $\chi_{yyy}^{(2)}$ and $\chi_{zyy}^{(2)}$ are set; the thickness of the sample to be tested, the experimental values of each set of light intensity of the fundamental light, the experimental values of each set of light intensity of the frequency-doubled light, the experimental values of each set of polarization azimuth angle of the frequency-doubled light, the experimental values of each set of ellipticity angle of the frequency-doubled light, and the experimental values of the susceptibility trial solutions $\chi_{yyy}^{(2)}$ and $\chi_{zyy}^{(2)}$ are input into the optical parameter simulation calculation module.

In the above step S310, in the case where only the y-polarization component is incident, $E_z=0$, the y-polarization component of the frequency-doubled light is only related to $\chi_{yyy}^{(2)}$, the z-polarization component of the frequency-doubled light is only related to $\chi_{zyy}^{(2)}$. The absolute values and phase dependencies of $\chi_{yyy}^{(2)}$ and $\chi_{zyy}^{(2)}$ can be calculated by using the present technical solution in combination with the efficiency and polarization information of the frequency-doubled light.

Step S320: when only the z-polarization component of the fundamental frequency light is incident, the experimental values of the susceptibility trial solutions $\chi_{yzz}^{(2)}$ and $\chi_{zzz}^{(2)}$ are respectively set; the thickness of the sample to be tested, the experimental values of each set of light intensity of the fundamental light, the experimental values of each set of light intensity of the frequency-doubled light, the experimental values of each set of polarization azimuth angle of the frequency-doubled light, the experimental values of each set of ellipticity angle of the frequency-doubled light, and the experimental values of the susceptibility trial solutions $\chi_{yyy}^{(2)}$ and $\chi_{zyy}^{(2)}$ are input into the optical parameter simulation calculation module.

In the above step S320, in the case where only the z-polarization component is incident, $E_y=0$, the y-polarization component of the frequency-doubled light is only related to $\chi_{yzz}^{(2)}$, the z-polarization component of the frequency-doubled light is only related to $\chi_{zzz}^{(2)}$. The absolute values and phase dependencies of $\chi_{yzz}^{(2)}$ and $\chi_{zzz}^{(2)}$ can be calculated by using the present technical solution in combination with the efficiency and polarization information of the frequency-doubled light.

Step S330: when the fundamental frequency light has both the y-polarization component and the z-polarization component, the experimental values of the susceptibility trial solutions $\chi_{yyz}^{(2)}$ and $\chi_{zyz}^{(2)}$ are respectively set; the thickness of the sample to be tested, the experimental values of each set of light intensity of the fundamental frequency light, the experimental values of each set of light intensity of the frequency-doubled light, the experimental values of each set of polarization azimuth angle of the frequency-doubled light, the experimental values of each set of ellipticity angle of the frequency-doubled light, and the experimental values of the susceptibility trial solutions $\chi_{yyz}^{(2)}$ and $\chi_{zyz}^{(2)}$ are input into the optical parameter simulation calculation module.

In the step S330, the incident fundamental frequency light has both the y-polarization component and the z-polarization component, the frequency-doubled light is also related to $\chi_{yyz}^{(2)}$ and $\chi_{zyz}^{(2)}$ in addition to the above four nonlinear susceptibilities. In a similar way, absolute values and phase relationships of six second-order nonlinear susceptibilities $\chi_{yyy}^{(2)}$, $\chi_{zyy}^{(2)}$, $\chi_{yzz}^{(2)}$, $\chi_{zzz}^{(2)}$, $\chi_{yyz}^{(2)}$ and $\chi_{zyz}^{(2)}$ can be obtained by using the technical solution of the present disclosure in combination with the efficiency and polarization information of the frequency-doubled light.

The step S400 includes:

step S410: a fitting curve of the second-order nonlinear susceptibilities $\chi_{yyy}^{(2)}$ and $\chi_{zyy}^{(2)}$ of the material is obtained through the step S310;

step S420: a fitting curve of the second-order nonlinear susceptibilities $\chi_{yzz}^{(2)}$ and $\chi_{zzz}^{(2)}$ of the material is obtained through the step S320;

step S430: a fitting curve of the second-order nonlinear susceptibilities $\chi_{yyz}^{(2)}$ and $\chi_{zyz}^{(2)}$ of the material is obtained through the step S330;

step S440: ratio relationships among the polarization parameters $\chi_{yyz}^{(2)}$, $\chi_{zzz}^{(2)}$, $\chi_{yzz}^{(2)}$, $\chi_{zzz}^{(2)}$, $\chi_{yyz}^{(2)}$ and $\chi_{zyz}^{(2)}$ and phase relationships among the polarization parameters $\chi_{yzz}^{(2)}$, $\chi_{zzz}^{(2)}$, $\chi_{yzz}^{(2)}$, $\chi_{zzz}^{(2)}$, $\chi_{yyz}^{(2)}$ and $\chi_{zyz}^{(2)}$ of the sample to be tested with the x-cut direction are obtained according to the above obtained fitting curves of the second-order nonlinear susceptibilities of the material.

Specifically, the relationship between $\chi_{yyy}^{(2)}$ and $\chi_{zyy}^{(2)}$ in the step S410 can be represented as $$\chi_{zyy}^{(2)} = \frac{|\chi_{zyy}^{(2)}|}{|\chi_{yyy}^{(2)}|}|\chi_{yyy}^{(2)}|e^{i\delta_{zyy}}$$

Where, $$\frac{|\chi_{zyy}^{(2)}|}{|\chi_{yyy}^{(2)}|}$$

is a ratio relationship between $\chi_{zyy}^{(2)}$ and $\chi_{yyy}^{(2)}$; and $\delta_{zyy}$ is a phase relationship between $\chi_{zyy}^{(2)}$ and $\chi_{yyy}^{(2)}$.

In an embodiment, the cut direction of the sample to be tested is y-cut direction, the thickness direction of the sample to be tested is y-direction, the direction of the light propagation is the y-direction, and x and z are the polarization directions.

The linearly polarized fundamental light is incident on the crystal surface and is transmitted along the y-axis, this moment there are only possible x and z polarization components of fundamental frequency light, and the matrix transformation is provided as follows:

$$\begin{bmatrix} P_x^{(2)} \\ P_y^{(2)} \\ P_z^{(2)} \end{bmatrix} = \varepsilon_0 \begin{pmatrix} \chi_{xxx}^{(2)} & \chi_{xyy}^{(2)} & \chi_{xzz}^{(2)} & \chi_{xyz}^{(2)} & \chi_{xzx}^{(2)} & \chi_{xxy}^{(2)} \\ \chi_{yxx}^{(2)} & \chi_{yyy}^{(2)} & \chi_{yzz}^{(2)} & \chi_{yyz}^{(2)} & \chi_{yzx}^{(2)} & \chi_{yxy}^{(2)} \\ \chi_{zxx}^{(2)} & \chi_{zyy}^{(2)} & \chi_{zzz}^{(2)} & \chi_{zyz}^{(2)} & \chi_{zzx}^{(2)} & \chi_{zxy}^{(2)} \end{pmatrix} \begin{bmatrix} E_xE_x \\ 0 \\ E_zE_z \\ 0 \\ 2E_zE_x \\ 0 \end{bmatrix} \quad \text{matrix (1-2)}$$

The matrix (1-2) can be transformed into the following equations:

$$\begin{cases} P_x^{(2)} = \chi_{xxx}^{(2)}E_xE_x + \chi_{xzz}^{(2)}E_zE_z + 2\chi_{xzx}^{(2)}E_zE_x \\ P_y^{(2)} = \chi_{yxx}^{(2)}E_xE_x + \chi_{yzz}^{(2)}E_zE_z + 2\chi_{yzx}^{(2)}E_zE_x \\ P_z^{(2)} = \chi_{zxx}^{(2)}E_xE_x + \chi_{zzz}^{(2)}E_zE_z + 2\chi_{zzx}^{(2)}E_zE_x \end{cases}$$

The step S300 includes the following steps.

Step S311: when only the x-polarization component of the fundamental frequency light is incident, experimental values of the susceptibility trial solutions $\chi_{xxx}^{(2)}$ and $\chi_{zxx}^{(2)}$ are set; the thickness of the sample to be tested, the experimental values of each set of light intensity of the fundamental light, the experimental values of each set of light intensity of the frequency-doubled light, the experimental values of each set of polarization azimuth angle of the frequency-doubled light, the experimental values of each set of ellipticity angle of the frequency-doubled light, and the experimental values of the susceptibility trial solutions $\chi_{xxx}^{(2)}$ and $\chi_{zxx}^{(2)}$ are input into the optical parameter simulation calculation module.

In the step S311, in the case where only the x-polarization component is incident, the x-polarization component of the frequency-doubled light is only related to $\chi_{xxx}^{(2)}$, the z-polarization component of the polarized frequency-doubled light is only related to $\chi_{zxx}^{(2)}$. The absolute values and phase dependencies of $\chi_{xxx}^{(2)}$ and $\chi_{zxx}^{(2)}$ can be calculated by using the present technical solution in combination with the efficiency and polarization information of the frequency-doubled light.

Step S321: when only the z-polarization component of the fundamental frequency light is incident, the experimental values of the susceptibility trial solutions $\chi_{xzz}^{(2)}$ and $\chi_{zzz}^{(2)}$ are set; the thickness of the sample to be tested, the experimental values of each set of light intensity of the fundamental light, the experimental values of each set of light intensity of the frequency-doubled light, the experimental values of each set of polarization azimuth angle of the frequency-doubled light, the experimental values of each set of ellipticity angle of the frequency-doubled light, and the experimental values of the susceptibility trial solutions $\chi_{xzz}^{(2)}$ and $\chi_{zzz}^{(2)}$ are input into the optical parameter simulation calculation module.

In the step S321, in the case where only the z-polarization component is incident, the x-polarization component of the frequency-doubled light is only related to $\chi_{xzz}^{(2)}$, the z-polarization component of the frequency-doubled light is only related to $\chi_{zzz}^{(2)}$. The absolute values and phase dependencies of and $\chi_{xzz}^{(2)}$ and $\chi_{zzz}^{(2)}$ can be calculated by using the present technical solution in combination with the efficiency and polarization information of the frequency-doubled light.

Step S331: when the fundamental frequency light has both the x-polarization component and the z-polarization component, the experimental values of the susceptibility trial solutions $\chi_{xzx}^{(2)}$ and $\chi_{zzx}^{(2)}$, are set; the thickness of the sample to be tested, the experimental values of each set of light intensity of the fundamental light, the experimental values of each set of light intensity of the frequency-doubled light, the experimental values of each set of polarization azimuth angle of the frequency-doubled light, the experimental values of each set of ellipticity angle of the frequency-doubled light, and the experimental values of the susceptibility trial solutions $\chi_{xzx}^{(2)}$ and $\chi_{zzx}^{(2)}$ are input into the optical parameter simulation calculation module.

In the step S331, the incident fundamental frequency light has both the x-polarization component and the z-polarization component, the frequency-doubled light is also related to $\chi_{xzx}^{(2)}$ and $\chi_{zzx}^{(2)}$ in addition to the above four nonlinear susceptibilities. In a similar way, absolute values and phase relationships of six second-order nonlinear susceptibilities $\chi_{xxx}^{(2)}$, $\chi_{zxx}^{(2)}$, $\chi_{xzz}^{(2)}$, $\chi_{zzz}^{(2)}$, $\chi_{xzx}^{(2)}$ and $\chi_{zzx}^{(2)}$ can be obtained by using the technical solution of the present disclosure in combination with the efficiency and polarization information of the frequency-doubled light.

The step S400 includes:

step S411: a fitting curve of the second-order nonlinear susceptibilities $\chi_{xxx}^{(2)}$ and $\chi_{zxx}^{(2)}$ of the material is obtained through the step S311;

step S421: a fitting curve of the second-order nonlinear susceptibilities $\chi_{xzz}^{(2)}$ and $\chi_{zzz}^{(2)}$ of the material is obtained through the step S321;

step S431: a fitting curve of the second-order nonlinear susceptibilities $\chi_{xzx}^{(2)}$ and $\chi_{zzx}^{(2)}$ of the material is obtained through the step S331;

step S441: ratio relationships among the polarization parameters $\chi_{xxx}^{(2)}$, $\chi_{zxx}^{(2)}$, $\chi_{xzz}^{(2)}$, $\chi_{zzz}^{(2)}$, $\chi_{xzx}^{(2)}$ and $\chi_{zzx}^{(2)}$ and phase relationships among the polarization parameters $\chi_{xxx}^{(2)}$, $\chi_{zxx}^{(2)}$, $\chi_{xzz}^{(2)}$, $\chi_{zzz}^{(2)}$, $\chi_{xzx}^{(2)}$ and $\chi_{zzx}^{(2)}$ of the sample to be tested with the x-cut direction are obtained according to the above obtained fitting curves of the second-order nonlinear susceptibilities of the material.

For example, the relationship between $\chi_{xxx}^{(2)}$ and $\chi_{zxx}^{(2)}$ in the step S411 can be represented as:

$$\chi_{zxx}^{(2)} = \frac{|\chi_{zxx}^{(2)}|}{|\chi_{xxx}^{(2)}|} |\chi_{xxx}^{(2)}| e^{i\delta_{zxx}}$$

Where, $$\frac{|\chi_{zxx}^{(2)}|}{|\chi_{xxx}^{(2)}|}$$

is a ratio relationship between $\chi_{zxx}^{(2)}$ and $\chi_{xxx}^{(2)}$; and $\delta_{zxx}$ is a phase relationship between $\chi_{zxx}^{(2)}$ and $\chi_{xxx}^{(2)}$.

In an embodiment, the cut direction of the sample to be tested is z-cut direction, the thickness direction of the sample to be tested is z-direction, the direction of the light propagation direction is the z-direction, and x and z are polarization directions.

The linearly polarized fundamental frequency light is incident on the crystal surface and is transmitted along the z-axis, this moment there are only possible x and y polarization components of fundamental frequency light, and the matrix transformation is provided as follows:

$$\begin{bmatrix} P_x^{(2)} \\ P_y^{(2)} \\ P_z^{(2)} \end{bmatrix} = \varepsilon_0 \begin{pmatrix} \chi_{xxx}^{(2)} & \chi_{xyy}^{(2)} & \chi_{xzz}^{(2)} & \chi_{xyz}^{(2)} & \chi_{xzx}^{(2)} & \chi_{xxy}^{(2)} \\ \chi_{yxx}^{(2)} & \chi_{yyy}^{(2)} & \chi_{yzz}^{(2)} & \chi_{yyz}^{(2)} & \chi_{yzx}^{(2)} & \chi_{yxy}^{(2)} \\ \chi_{zxx}^{(2)} & \chi_{zyy}^{(2)} & \chi_{zzz}^{(2)} & \chi_{zyz}^{(2)} & \chi_{zzx}^{(2)} & \chi_{zxy}^{(2)} \end{pmatrix} \begin{bmatrix} E_x E_x \\ E_y E_y \\ 0 \\ 0 \\ 0 \\ 2E_x E_y \end{bmatrix} \quad \text{matrix (1-3)}$$

The matrix (1-3) can be transformed into the following equations:

$$\begin{cases} P_x^{(2)} = \chi_{xxx}^{(2)} E_x E_x + \chi_{xyy}^{(2)} E_y E_y + 2\chi_{xxy}^{(2)} E_x E_y \\ P_y^{(2)} = \chi_{yxx}^{(2)} E_x E_x + \chi_{yyy}^{(2)} E_y E_y + 2\chi_{yxy}^{(2)} E_x E_y \\ P_z^{(2)} = \chi_{zxx}^{(2)} E_x E_x + \chi_{zyy}^{(2)} E_y E_y + 2\chi_{zxy}^{(2)} E_x E_y \end{cases}$$

The step S300 includes the following steps.

Step S311a: when only the x-polarization component of the fundamental frequency light is incident, the experimental values of the susceptibility trial solutions $\chi_{xxx}^{(2)}$ and $\chi_{yxx}^{(2)}$ are set; the thickness of the sample to be tested, the experimental values of each set of light intensity of the fundamental light, the experimental values of each set of light intensity of the frequency-doubled light, the experimental values of each set of polarization azimuth angle of the frequency-doubled light, the experimental values of each set of ellipticity angle of the frequency-doubled light, and the experimental values of the susceptibility trial solutions $\chi_{xxx}^{(2)}$ and $\chi_{yxx}^{(2)}$ are input into the optical parameter simulation calculation module.

In the step S311a, in the case where only the x-polarization component is incident, the x-polarization component of the frequency-doubled light is only related to $\chi_{xxx}^{(2)}$, the y-polarization component of the frequency-doubled light is only related to $\chi_{yxx}^{(2)}$. The absolute values and phase dependencies of $\chi_{xxx}^{(2)}$ and $\chi_{yxx}^{(2)}$ can be calculated by using the present technical solution in combination with the efficiency and polarization information of the frequency-doubled light.

Step S321a: when only the y-polarization component of the fundamental frequency light is incident, the experimental values of the susceptibility trial solutions $\chi_{xyy}^{(2)}$ and $\chi_{yyy}^{(2)}$ are set; the thickness of the sample to be tested, the experimental values of each set of light intensity of the fundamental light, the experimental values of each set of light intensity of the frequency-doubled light, the experimental values of each set of polarization azimuth angle of the frequency-doubled light, the experimental values of each set of ellipticity angle of the frequency-doubled light, and the experimental values of the susceptibility trial solutions $\chi_{xyy}^{(2)}$ and $\chi_{yyy}^{(2)}$ are input into the optical parameter simulation calculation module.

In the step S321a, in the case where only the z-polarization component is incident, the x-polarization component of the frequency-doubled light is only related to $\chi_{xyy}^{(2)}$, the y-polarization component of the frequency-doubled light is only related to $\chi_{yyy}^{(2)}$. The absolute values and phase dependencies of $\chi_{xyy}^{(2)}$ and $\chi_{yyy}^{(2)}$ can be calculated by using the present technical solution in combination with the efficiency and polarization information of the frequency-doubled light.

Step S331a: when the fundamental frequency light has both the x-polarization component and the y-polarization component, the experimental values of the susceptibility trial solutions $\chi_{xxy}^{(2)}$ and $\chi_{yxy}^{(2)}$ are set; the thickness of the sample to be tested, the experimental values of each set of light intensity of the fundamental light, the experimental values of each set of light intensity of the frequency-doubled light, the experimental values of each set of polarization azimuth angle of the frequency-doubled light, the experimental values of each set of ellipticity angle of the frequency-doubled light, and the experimental values of the susceptibility trial solutions $\chi_{xxy}^{(2)}$ and $\chi_{yxy}^{(2)}$ are input into the optical parameter simulation calculation module.

In the step S331a, when the incident fundamental frequency light has both the x-polarization component and the y-polarization component, the frequency-doubled light is also related to $\chi_{xxy}^{(2)}$ and $\chi_{yxy}^{(2)}$ in addition to the above four nonlinear susceptibilities. In a similar way, absolute values and phase relationships of six second-order nonlinear susceptibilities $\chi_{xxx}^{(2)}$, $\chi_{yxx}^{(2)}$, $\chi_{xyy}^{(2)}$, $\chi_{yyy}^{(2)}$, $\chi_{xxy}^{(2)}$ and $\chi_{yxy}^{(2)}$ can be obtained by using the technical solution of the present disclosure in combination with the efficiency and polarization information of the frequency-doubled light.

The step S400 includes:

step S411a: a fitting curve of the second-order nonlinear susceptibilities $\chi_{xxx}^{(2)}$ and $\chi_{yxx}^{(2)}$ of the material is obtained through the step S311a;

step S421a: a fitting curve of the second-order nonlinear susceptibilities $\chi_{xyy}^{(2)}$ and $\chi_{yyy}^{(2)}$ of the material is obtained through the step S321a;

step S431a: a fitting curve of the second-order nonlinear susceptibilities $\chi_{xxy}^{(2)}$ and $\chi_{yxy}^{(2)}$ of the material is obtained through the step S331a;

step S441a: ratio relationships among the polarization parameters $\chi_{xxx}^{(2)}$, $\chi_{yxx}^{(2)}$, $\chi_{xyy}^{(2)}$, $\chi_{yyy}^{(2)}$, $\chi_{xxy}^{(2)}$ and $\chi_{yxy}^{(2)}$ phase relationships among the polarization parameters $\chi_{xxx}^{(2)}$, $\chi_{yxx}^{(2)}$, $\chi_{xyy}^{(2)}$, $\chi_{yyy}^{(2)}$, $\chi_{xxy}^{(2)}$ and $\chi_{yxy}^{(2)}$ of the sample to be tested with the x-cut direction are obtained according to the above obtained fitting curves of the second-order nonlinear susceptibilities of the material.

For example, the relationship between $\chi_{xxx}^{(2)}$ and $\chi_{yxx}^{(2)}$ in the step S411a can be represented as:

$$\chi_{yxx}^{(2)} = \frac{|\chi_{yxx}^{(2)}|}{|\chi_{xxx}^{(2)}|} |\chi_{xxx}^{(2)}| e^{i\delta_{yxx}}$$

Where, $$\frac{|\chi_{xxx}^{(2)}|}{|\chi_{zzz}^{(2)}|}$$

is a ratio relationship between $\chi_{yxx}^{(2)}$ and $\chi_{xxx}^{(2)}$; and $\delta_{yxx}$ is a phase relationship between $\chi_{yxx}^{(2)}$ and $\chi_{xxx}^{(2)}$.

In an embodiment, after going through the above three situations of S310-S330, S311-S331, and S311a-S331a, the absolute values and phase relationships of all second-order nonlinear susceptibilities except for $\chi_{xyz}^{(2)}$, $\chi_{yzx}^{(2)}$, $\chi_{zxy}^{(2)}$ can be obtained. It can be seen from the actual comparison that fifteen second-order nonlinear polarization parameters are obtained. Finally, for the steps S310-S330 in which the sample to be tested is of the x-cut direction, $\chi_{xyz}^{(2)}$ can be obtained by collecting the intensity of the x-polarization frequency-doubled light signal emitted from other directions and combining the known $\chi_{xyy}^{(2)}$ and $\chi_{xzz}^{(2)}$. For the steps S311-S331 in which the sample to be tested is of the y-cut direction, $\chi_{yzx}^{(2)}$ can be obtained by collecting the intensity of the y-polarization frequency-doubled light signal emitted from other directions and combining the known $\chi_{yxx}^{(2)}$ and $\chi_{yzz}^{(2)}$. For the steps S311a-S331a in which the sample to be tested and is of the z-cut direction, $\chi_{zxy}^{(2)}$ can be obtained by collecting the intensity of the z-polarization frequency-doubled light signal emitted from other directions and combining the known $\chi_{zxx}^{(2)}$ and $\chi_{zyy}^{(2)}$. Finally, all the eighteen independent second-order nonlinear polarization parameters can be obtained.

Figure 4:
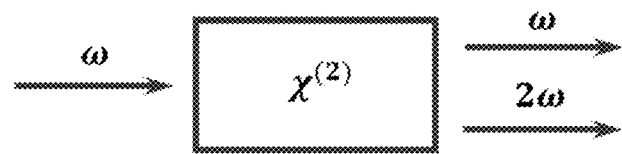
FIG. 4 is a schematic view of a principle of generation of a frequency-doubled light according to an embodiment of the present disclosure.

In a specific embodiment, the second-order nonlinear susceptibility of the sample to be tested of the x-cut is tested. Referring to FIG. 4, which shows a schematic diagram illustrating a generation principle of frequency-doubled light. A monochromatic plane wave with a light intensity E and a frequency ω is incident on a crystal with the non-zero second-order nonlinear susceptibility $\chi^{(2)}$, the second-order nonlinear polarizability intensity generated in the crystal is represented by formula (2).

$$p^{(2)} = \varepsilon_0 \chi^{(2)} E^2 \qquad \text{formula (2)}$$

The above polarization intensity radiates out an electric field with a frequency E, which is the generation process of the frequency-doubled light.

Figure 5:
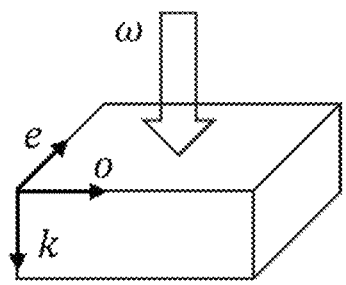
FIG. 5 is a schematic view of a test principle of a x-cut lithium niobate according to an embodiment of the present disclosure.

Referring to FIG. 5, which shows the x-cut lithium niobate (LiNbO$_3$). e is the optical axial direction of the crystal, and the propagation direction of light is k. The fundamental frequency light is of normal incidence on the crystal interface.

The second-order nonlinear polarization intensity in the LiNbO$_3$ crystal can be represented as the above-mentioned formula (1). For the x-cut LiNbO$_3$ shown in FIG. 5, the matrix representation of the relationship between the frequency-doubled light polarization intensity and the fundamental frequency electric field is:

$$\begin{bmatrix} P_k^{(2)} \\ P_o^{(2)} \\ P_e^{(2)} \end{bmatrix} = \varepsilon_0 \begin{bmatrix} 0 & 0 & 0 & 0 & \chi_{ooe}^{(2)} & -\chi_{ooo}^{(2)} \\ -\chi_{ooo}^{(2)} & \chi_{ooo}^{(2)} & 0 & \chi_{ooe}^{(2)} & 0 & 0 \\ \chi_{eoo}^{(2)} & \chi_{eoo}^{(2)} & \chi_{eee}^{(2)} & 0 & 0 & 0 \end{bmatrix} \begin{bmatrix} 0 \\ E_o^2 \\ E_e^2 \\ 2E_oE_e \\ 0 \\ 0 \end{bmatrix} \quad \text{matrix (2)}$$

The matrix (2) can be written as the following formula (3):

$$\begin{cases} P_k^{(2)} = 0; \\ P_o^{(2)} = \chi_{ooo}^{(2)} E_o^2 + 2\chi_{ooe}^{(2)} E_o E_e \\ P_e^{(2)} = \chi_{eoo}^{(2)} E_o^2 + \chi_{eee}^{(2)} E_e^2 \end{cases} \quad \text{formula (3)}$$

The above formula indicates that the incident components of the fundamental frequency light ($E_o$ and $E_e$) are converted into a frequency-doubled light signal of each component under the action of each component of the second-order nonlinear susceptibility $\chi^{(2)}$. Each component of the second-order nonlinear susceptibility can be calculated by the correlation analysis of the fundamental frequency light and the frequency-doubled light.

Figure 6:
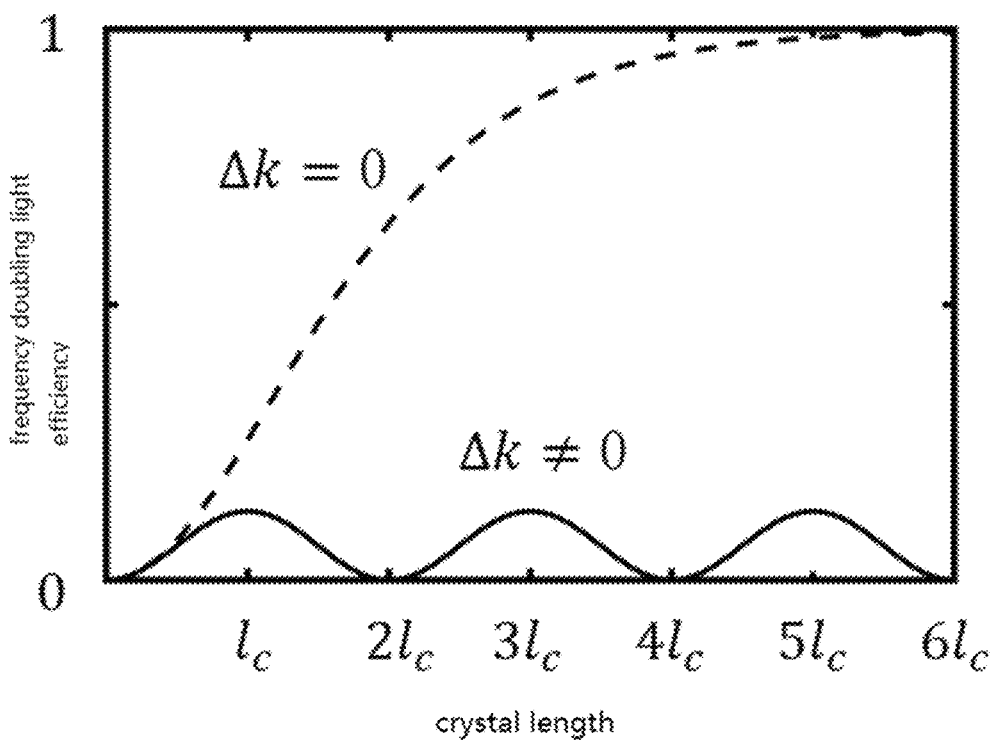
FIG. 6 is a diagram showing efficiencies of a frequency-doubled light in the phase match and the phase mismatch according to an embodiment of the present disclosure.

Referring to FIG. 6, regardless of the absorption and scattering of light by the crystal, the conversion from the fundamental frequency light to the frequency-doubled light should satisfy the momentum conservation law, as shown in the following formula (4):

$$\Delta k = k_2 - 2k_1 = \frac{4\pi}{\lambda_0}(n(2\omega) - n(\omega)) \quad \text{formula (4)}$$

When $\Delta k=0$, $n(2\omega)=n(\omega)$, which is the phase matching condition. This moment, the incident fundamental frequency light can be maximally transformed into the frequency-doubled light. However, because the natural material has dispersion, usually $n(2\omega) \neq n(\omega)$. This moment, $n(2\omega) \neq n(\omega)$, i.e., the phase mismatch occurs. For the results caused by the phase mismatch in the frequency-doubled light, the coherent length is introduced to perform the analysis. The coherent length is defined by the following formula (5):

$$l_c = \frac{\pi}{\Delta k} = \frac{\lambda_0}{4(n(2\omega) - n(\omega))} \quad \text{formula (5)}$$

The physics meaning of formula (5) is that, when the fundamental frequency light enters the crystal, there is the maximum value of the light intensity of the frequency-doubled light for every length which is odd times of $l_c$; there is the minimum value of the light intensity of the frequency-doubled light for every length which is even multiple of $l_c$. Under the normal dispersion, $l_c$ ranges from a few microns to 100 microns.

FIG. 6 shows a schematic diagram of a frequency-doubled light efficiency under phase match and phase mismatch. A relationship between the frequency-doubled light efficiency and the crystal length in the case of $\Delta k=0$ and $\Delta k \neq 0$ can be seen from FIG. 6, where $\Delta k$ denotes wave vector mismatches, and satisfies $\Delta k=2k_{2\omega}-k_\omega$.

In the frequency doubling process of the x-cut lithium niobate film, as shown in the above formula (3), there are four second-order nonlinear susceptibilities at work, $\chi_{eoo}^{(2)}$, $\chi_{ooo}^{(2)}$, $\chi_{ooe}^{(2)}$ and $\chi_{eee}^{(2)}$ respectively.

Specifically,

1. When the polarization azimuth angle a of the incident fundamental frequency light is 90° (e light is incident), $P_e^{(2)} = \chi_{eee}^{(2)} E_e^2$, only $\chi_{eee}$ works. This moment, the emergent frequency-doubled light is only the e light ($\phi=90°$ and $\xi=0°$).

2. When the polarization azimuth angle α of the incident fundamental frequency light is 0° (o light is incident), $P_o^{(2)} = \chi_{ooo}^{(2)} E_o^2$, $P_e^{(2)} = \chi_{eoo}^{(2)} E_o^2$. This moment, $\chi_{eoo}^{(2)}$ and $\chi_{ooo}^{(2)}$ work.

3. When the polarization azimuth angle a of the incident fundamental frequency light ranges from 0° to 90°, $P_o^{(2)} = \chi_{ooo}^{(2)} E_o^2 + 2\chi_{ooe}^{(2)} E_o E_e$, $P_e^{(2)} = \chi_{eoo}^{(2)} + \chi_{eee}^{(2)} E_e^2$. This moment, the four second-order nonlinear susceptibilities simultaneously work.

In the last two cases, all the emergent frequency-doubled light is elliptically polarized light (simultaneously including o-component and e-component).

The solution procedure is provided as follows.

During the solution of the second-order nonlinear susceptibility, an optical parameter simulation calculation module is utilized to perform a fitting calculation on the experiment results.

Step one: under the configuration of $\alpha=90°$, the frequency doubling process is only related to $\chi_{eee}^{(2)}$, thus the conversion efficiency of the frequency-doubled light under this configuration can be utilized to perform the fitting calculation to obtain an absolute value of $\chi_{eee}^{(2)}$ of the lithium niobite.

Step two: under other configurations, ratio relationships between $\chi_{eoo}^{(2)}$ and $\chi_{eee}^{(2)}$, between $\chi_{ooo}^{(2)}$ and $\chi_{eee}^{(2)}$ and between $\chi_{ooe}^{(2)}$ and $\chi_{eee}^{(2)}$ are obtained all at once by fitting the polarization state of the frequency-doubled light.

Step three: numerical values of all second-order nonlinear susceptibilities can be obtained by the absolute value of $\chi_{eee}^{(2)}$ and the ratio relationship between each of other second-order nonlinear susceptibilities and $\chi_{eee}^{(2)}$.

Figure 7:
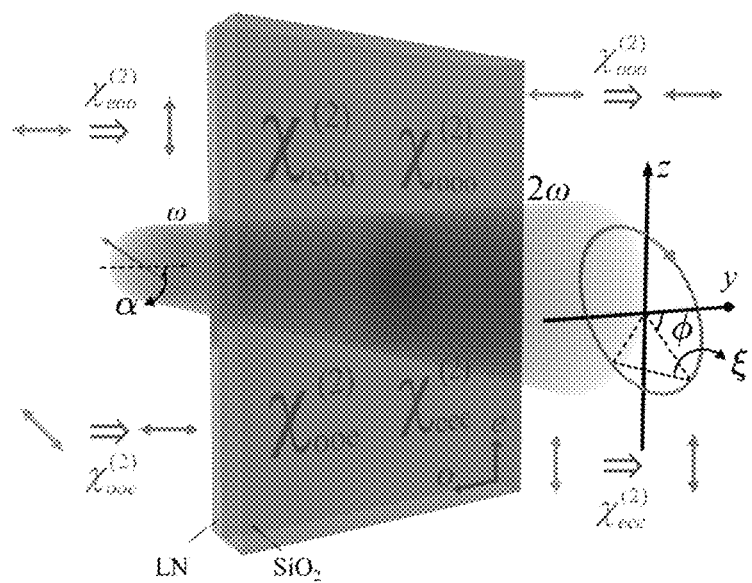
FIG. 7 is a schematic view of a forming principle of a frequency-doubled light through a lithium niobate film according to an embodiment of the present disclosure.

Referring to FIG. 7, a principle of the second-order nonlinear susceptibility acting in a frequency doubling process of a lithium niobate film is shown. A sample as shown in FIG. 7 is an LN (Lithium Niobate) film on a $SiO_2$ substrate. The film thickness is in the order of hundreds of nanometers. The polarization state of the frequency-doubled light with frequency $2\omega$ changes with the polarization state of the fundamental frequency light with frequency $\omega$, and the polarization states of the two are different. The fundamental frequency light is a beam of linearly polarized light, the polarization azimuth angle α of the fundamental frequency light is variable and the clockwise is positive direction. The frequency-doubled light is elliptically polarized light, the polarization state of the frequency-doubled light is described by the polarization azimuth angle $\phi$ and the ellipticity angle $\xi$ of the frequency-doubled light.

Specifically, the polarization azimuth angle α of the fundamental frequency light describes an angle between the polarization direction of the fundamental frequency light and the y-axis, and the clockwise is positive direction. The polarization azimuth angle $\phi$ of the frequency-doubled light describes an angle between the long axis of an elliptical polarization of the frequency-doubled light and the y-axis, and the clockwise is positive direction. The ellipticity angle $\xi$ of the frequency-doubled light describes an arctangent angle of a ratio of the minor semi-axis to the major semi-axis of an elliptical polarization of the frequency-doubled light. The ellipticity angle ξ of the linearly polarized light is 0.

A method for measuring the second-order nonlinear susceptibility of the lithium niobate film based on polarization information of frequency-doubled light is provided.

For the specific experiment, a schematic diagram illustrating a light path structure for measuring a second-order nonlinear susceptibility of a lithium niobate film based on polarization information of frequency-doubled light as shown in FIG. 2 can be employed.

The system 20 for determining the second-order nonlinear susceptibility of a material is implemented by using, without limiting to, the following optical components. The laser light source 100 is a tunable femtosecond laser. The first prism 210 is a Glan-Taylor prism which is configured to polarize, that is, the laser light is converted into linearly polarized light. The half-wave plate 220 is configured to adjust the polarization azimuth angle of linearly polarized fundamental frequency light, and can adjust the polarization azimuth angle at any angle. The first multi-magnification objective lens 230 is a 10-magnification objective lens (0.25 N.A.). The sample to be tested is a lithium niobate film sample. The second multi-magnification objective lens 310 is a 20-magnification objective lens (0.4 N.A.). The color filter 320 is configured to filter out the linearly polarized fundamental frequency light, and the specific frequency range of the fundamental frequency light filtered out depends on the wavelength of the fundamental frequency light used in the experiments. The quarter-wave plate 411, the second prism 412 (which can be a Glan-Taylor prism), and the convex lens 413 together form a compound lens 410, which is configured to analyze and focus the frequency-doubled light signal. The signal detector 420 is configured to acquire the polarization azimuth angle, the ellipticity angle and the light intensity of the frequency-doubled light.

The measuring of the second-order nonlinear susceptibility of the lithium niobate film sample by using the system 20 for determining the second-order nonlinear susceptibility of a material includes the following steps.

Step one: a tunable femtosecond laser is configured to generate a fundamental frequency signal; femtosecond laser light is converted into linearly polarized light through a Glan-Taylor prism (the first prism 210).

Step two: the polarization azimuth angle of the linearly polarized light is tuned by an achromatic half-wave plate (the half-wave plate 220).

Step three: a 10-magnification objective lens (0.25 N.A.) is utilized to focus the fundamental frequency signal onto the lithium niobate film sample to generate the frequency-doubled light, and another 20-magnification objective lens (0.4 N.A.) is configured to collect a signal.

Step four: the fundamental frequency signal is completely filtered out through the color filter (the color filter 320), and only the frequency-doubled light signal remains.

Step five: the frequency-doubled light signal passes through a rotatable quarter-wave plate, the prism 412, and the signal detector 420, the polarization and intensity of the frequency-doubled light signal are acquired and recorded. The convex lens 413 is configured to focus the frequency-doubled light signal.

Step six: the acquired polarization and intensity of the frequency-doubled light are input to the optical parameter simulation calculation module to perform the fitting calculation, to obtain the second-order nonlinear susceptibility of the lithium niobate film sample. When using the optical parameter simulation calculation module to perform the fitting calculation, the parameters such as the laser light power, the sample thickness, the refractive index and so on are completely consistent with the experimental values.

Analysis of measurement results obtained by measuring the second-order nonlinear susceptibility of the lithium niobate film based on the polarization information of the frequency-doubled light is performed as below.

Figure 8A:
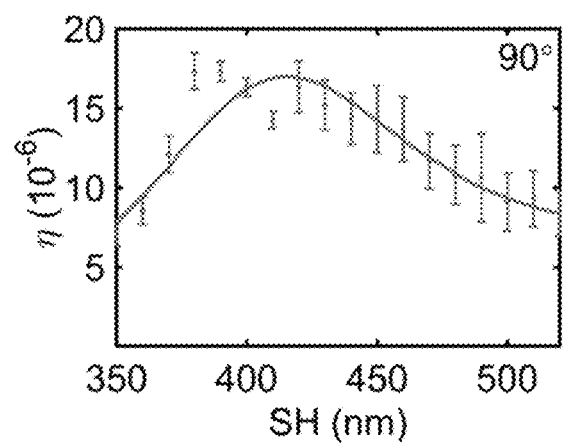
FIG. 8A shows an absolute conversion efficiency of a frequency-doubled light of a material when a polarization azimuth angle of a fundamental frequency light is 90° according to an embodiment of the present disclosure.
Figure 8B:
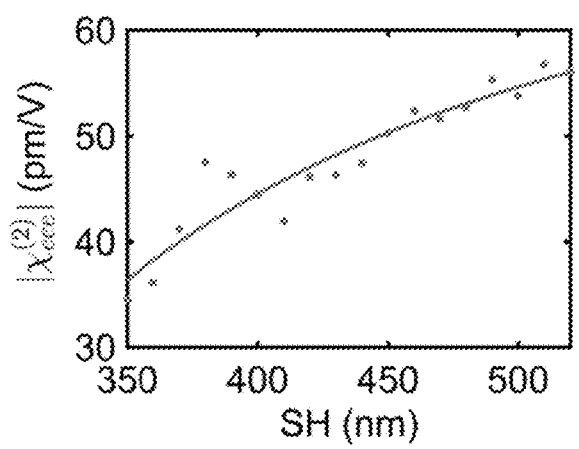
FIG. 8B shows a second-order nonlinear susceptibility fitting curve of a material obtained from a fitting calculation of an optical parameter simulation calculation module according to the embodiment of the present disclosure.

Referring to FIG. 8, FIG. 8A shows an absolute conversion efficiency of frequency-doubled light of a sample when a polarization azimuth angle a of the fundamental frequency light is 90°. FIG. 8B shows $|\chi_{eee}^{(2)}|$ obtained by fitting and solving via the optical parameter simulation calculation module. The sampling points in FIG. 8A are the experimental values, and the solid line is the simulation value of $|\chi_{eee}^{(2)}|$ based on the fitting. The simulation value is well consistent with the experimental value.

Referring to FIG. 9, FIGS. 9A and 9B respectively show a dependence of the polarization state of the frequency-doubled light signal on the polarization azimuth angle of the fundamental frequency light under a frequency-doubled light wavelength of 350 nm and a frequency-doubled light wavelength of 500 nm. FIGS. 9C and 9D respectively show the ratio relationship and the phase relationship between each of $\chi_{eoo}^{(2)}$, $\chi_{ooo}^{(2)}$, $\chi_{ooe}^{(2)}$ and the absolute value of $\chi_{eee}^{(2)}$, where $\chi_{eoo}^{(2)}$, $\chi_{ooo}^{(2)}$, $\chi_{ooe}^{(2)}$ and $\chi_{eee}^{(2)}$ are obtained by fitting and solving via an optical parameter simulation calculation module.

The ratio of each of $\chi_{eoo}^{(2)}$, $\chi_{ooo}^{(2)}$, $\chi_{ooe}^{(2)}$ to the absolute value of $\chi_{eee}^{(2)}$ can be represented as the following formula (6):

$$\chi_{ijk}^{(2)} = \frac{|\chi_{ijk}^{(2)}|}{|\chi_{eee}^{(2)}|}|\chi_{eee}^{(2)}|e^{i\delta_{ijk}} \quad \text{formula (6)}$$

For the position relationship between each of $\chi_{eoo}^{(2)}$, $\chi_{ooo}^{(2)}$, $\chi_{ooe}^{(2)}$ and $\chi_{eee}^{(2)}$, FIG. 9D can be referred to. The sampling points in FIGS. 9A and 9B are experimental values. The solid line is a simulation value of a result obtained by solving based on FIGS. 9C and 9D. The simulation value is well consistent with the experimental value.

The advantage of measuring the second-order nonlinear susceptibility of the lithium niobate film based on polarization information of frequency-doubled light in the present disclosure compared to the conventional method is provided as follows.

Some advantages in data processing include:

1. In the process of solving of the second-order nonlinear susceptibility: the conventional method depends on analytical formulas to perform the fitting calculation, and there are many approximations in the calculation process. However, in the method for determining the second-order nonlinear susceptibility of a material of the present disclosure, an optical parameter simulation calculation module is employed to calculate the second-order nonlinear susceptibility, and the calculation result is more accurate. The method for determining the second-order nonlinear susceptibility of a material in the present disclosure can also reduce the complex problems in the actual experiments such as film interference, birefringence effect, etc.

2. When involving to the fitting of the conversion efficiency of the frequency-doubled light, the thickness of the sample needs to be accurately known. Samples that can be tested by the conventional method all have a thickness of micron or millimeter, it is difficult to improve the measurement accuracy. If the measurement error of the crystal thickness is equivalent to the coherent length of the frequency-doubled light of the sample, which can cause a significant error. For the sample measured by the method for determining the second-order nonlinear susceptibility of a material in the present disclosure, the sample thickness is of hundreds of nanometers. In the present application, an existing measuring technique can be employed to accurately measure the thickness to 0.1 nm. In the present disclosure, there is no need to compare the measurement error of the crystal thickness to the coherent length of the frequency-doubled light of the sample. The measurement method in the present disclosure does not result in any unnecessary error.

3. By using the method for determining the second-order nonlinear susceptibility of a material in the present disclosure, not only the absolute value of the second-order nonlinear susceptibility can be measured, but also the phase relationship between the second-order nonlinear susceptibilities can be obtained based on the polarization information of the double frequency light, which is more conducive to the analysis of the properties of the sample to be tested.

Some advantages of the test system include:

1. Maker fringes method and Kurtz powder technology in the conventional test system belong to relative measurement technology, which need to perform a comparison with a standard sample such as KDP. The formation of fringes in the Maker fringes method depends on wave vector mismatch, thus the thickness of the sample needs to be greater than the coherent length (above micron) of the material to be tested, while the powder method requires the sample to be powdery, and the measurement error is larger. Therefore, the two methods above cannot be employed to directly measure the film sample with the thickness of hundreds of nanometers which can be tested by the system 20 for determining the second-order nonlinear susceptibility of the material.

2. The efficiency measurement method of the conventional test system is an absolute measurement method, in which the second-order nonlinear susceptibility is solved according to the relationship between the absolute conversion efficiency of the frequency-doubled light and the analytical formula. However, when solving each second-order nonlinear susceptibility, it is required to exactly know a mode of the light beam, the space structure, the focusing condition, and whether the phase match is implemented, which is very tedious. However, the system 20 for determining a second-order nonlinear susceptibility of a material in the present disclosure only needs to solve the absolute efficiency once to obtain the absolute value of the second-order nonlinear susceptibility ($\chi_{eee}^{(2)}$), then the ratio relationship and phase relationship between each of other second-order nonlinear susceptibilities and the absolute value of $\chi_{eee}^{(2)}$ is determined according to the polarization state of the frequency-doubled light, so as to obtain all second-order nonlinear susceptibilities and avoid multiple measurements of the absolute efficiency.

Referring to the above embodiments, the system and method for determining the second-order nonlinear susceptibility of a material provided by the present disclosure can implement the measurement of the second-order nonlinear susceptibility of the above-mentioned x-cut material, and can also implement the measurements of the second-order nonlinear susceptibilities of the y-cut and z-cut materials, details are not repeated herein.

The technical features of the embodiments described above can be arbitrarily combined. In order to simplify the description, not all possible combinations of the technical features in the above embodiments are described herein. However, as long as there is no contradiction in these combinations of these technical features, these combinations should be considered as the scope of the present disclosure.

The above-mentioned embodiments are merely several exemplary embodiments of the present invention, and their descriptions are more specific and detailed, but they cannot be understood as limiting the scope of the present disclosure. It should be noted that, those skilled in the art can make several modifications and improvements without departing from the concept of the present disclosure, which all belong to the scope of protection of the present disclosure. Therefore, the scope of protection of the present disclosure shall be subject to the appended claims.

What is claimed is:

1. An optical system, comprising:
    a laser light source, configured to generate a fundamental frequency light;
    a polarization modulator, configured to receive and polarize the fundamental frequency light, output a linearly polarized fundamental frequency light to irradiate a sample to be tested with the linearly polarized fundamental frequency light to generate a frequency-doubled light;
    a light collector, configured to collect the linearly polarized fundamental frequency light and the frequency-doubled light and filter out the linearly polarized fundamental frequency light to output the frequency-doubled light; and
    a polarization detector, configured to detect a polarization state and a light intensity of the frequency-doubled light, the polarization state comprising a polarization azimuth angle and an ellipticity angle of the frequency-doubled light.

2. The optical system according to claim 1, wherein the polarization detector comprises:
    a compound lens, configured to analyze and focus the frequency-doubled light output from the light collector; and
    a signal detector, configured to acquire the polarization azimuth angle, the ellipticity angle, and the light intensity of the frequency-doubled light from the filtered, analyzed, and focused frequency-doubled light.

3. A system for determining a second-order nonlinear susceptibility of a material, comprising:
    a laser light source, configured to generate a fundamental frequency light;
    a polarization modulator, configured to receive and polarize the fundamental frequency light, output a linearly polarized fundamental frequency light to irradiate a sample to be tested with the linearly polarized fundamental frequency light to generate a frequency-doubled light;
    a light collector, configured to collect the linearly polarized fundamental frequency light and the frequency-doubled light and filter out the linearly polarized fundamental frequency light to output the frequency-doubled light; and
    a polarization detector, configured to detect a polarization state and a light intensity of the frequency-doubled light, the polarization state comprising a polarization azimuth angle and an ellipticity angle of the frequency-doubled light; and
    a controller, connected to the laser light source, the polarization modulator, the light collector, and the polarization detector respectively, and configured to perform multiple sets of optical tests on the sample to be tested, each set of optical tests resulting in a set of test data, wherein the controller is configured to obtain a second-order nonlinear susceptibility of the sample to be tested according to the test data; the set of test data comprising a light intensity of the fundamental frequency light, a polarization azimuth angle of the fundamental frequency light, the polarization azimuth angle of the frequency-doubled light, the ellipticity angle of the frequency-doubled light, and the light intensity of the frequency-doubled light.

4. The system according to claim 3, wherein the controller comprises an optical parameter simulation calculation module configured to implement a simulation calculation of an optical parameter based on a finite element method or a finite-difference time-domain method in combination with Maxwell equations.

5. The system according to claim 3, wherein the polarization modulator comprises a first prism, a half-wave plate, and a first multi-magnification objective lens;
the first prism is arranged between the laser light source and the sample to be tested; the half-wave plate is arranged between the first prism and the sample to be tested;
the first multi-magnification objective lens is arranged between the half-wave plate and the sample to be tested.

6. The system according to claim 3, wherein the light collector comprises a second multi-magnification objective lens and a color filter;
the second multi-magnification objective lens is arranged on a frequency-doubled light producing side of the sample to be tested to collect a light transmitted from the sample to be tested;
the color filter is arranged between the second multi-magnification objective lens and the polarization detector, to filter out the linear polarized fundamental frequency light and transmit the frequency-doubled light to the polarization detector.

7. The system according to claim 3, wherein the polarization detector comprises:
a compound lens, configured to analyze and focus the frequency-doubled light output from the light collector; and
a signal detector, configured to acquire the polarization azimuth angle, the ellipticity angle, and the light intensity of the frequency-doubled light from the filtered, analyzed, and focused frequency-doubled light.

8. The system according to claim 7, wherein the compound lens is arranged on one side of the color filter on which the fundamental frequency light is filtered out by the color filter, the compound lens comprises a quarter-wave plate, a second prism, and a convex lens; the signal detector is arranged on one side of the compound lens on which the polarization of the frequency-doubled light signal is analyzed and focused by the compound lens.

9. A method for determining a second-order nonlinear susceptibility of a material, comprising:
S100: providing a sample to be tested, determining a cut direction and a thickness of the sample to be tested;
S200: performing multiple sets of optical tests on the sample to be tested, recording experimental values of a light intensity and a polarization azimuth angle of a fundamental frequency light employed in each set of optical tests, and simultaneously recording experimental values of a light intensity, a polarization azimuth angle, and an ellipticity angle of a frequency-doubled light generated by exciting the sample to be tested in each set of optical tests;

S300: inputting one or more of following parameters into an optical parameter simulation calculation module:
a cut direction of the sample to be tested,
a thickness of the sample to be tested,
the experimental value of the light intensity of the fundamental frequency light employed in each set of optical tests,
the experimental value of the polarization azimuth angle of the fundamental frequency light employed in each set of optical tests,
the experimental value of the light intensity of the frequency-doubled light obtained in each set of optical tests,
the experimental value of the polarization azimuth angle of the frequency-doubled light obtained in each set of optical tests,
the experimental value of the ellipticity angle of the frequency-doubled light obtained in each set of optical tests, and
a susceptibility trial solution given to each set of optical tests;
S400: performing, by the optical parameter simulation calculation module, a fitting calculation to form a second-order nonlinear susceptibility fitting curve of the material, and obtaining the second-order nonlinear susceptibility of the material from the second-order nonlinear susceptibility fitting curve.

10. The method according to claim 9, further comprising:
obtaining a second-order nonlinear susceptibility experimental curve of the material according to the experimental value of the light intensity of the fundamental frequency light, the experimental value of the polarization azimuth angle of the fundamental frequency light, the experimental value of the light intensity of the frequency-doubled light, the experimental value of the polarization azimuth angle of the frequency-doubled light, and the experimental value of the ellipticity angle of the frequency-doubled light in each set of optical tests;
determining whether an error between the second-order nonlinear susceptibility fitting curve and the second-order nonlinear susceptibility experiment curve is within a preset error range from 0.5% to 5%;
if the error is not within the preset error range, adjusting the susceptibility trial solution to correct the second-order nonlinear susceptibility fitting curve of the material.

11. The method according to claim 10, wherein
the optical parameter simulation calculation module calculates a second-order nonlinear susceptibility $\chi_{ijk}^{(2)}$ of the material according to a calculation formula $P_i^{(2)}=\varepsilon_0\sum_{jk}\chi_{ijk}^{(2)}E_jE_k$ of a second-order nonlinear polarization intensity of a nonlinear crystal;
wherein, subscripts i, j and k are respectively Cartesian coordinate components; $P_i^{(2)}$ is an i-component of the second-order nonlinear polarization intensity, which determines a generation of an i-polarization component of the frequency-doubled light; $E_j$ is a j-polarization component of the fundamental frequency light; $E_k$ is a k-polarization component of the fundamental frequency light; $\varepsilon_0$ is a vacuum dielectric constant, which is equal to $8.85\times10^{-12}$ F/m;

the calculation formula $P_i^{(2)}=\varepsilon_0\Sigma_{jk}\chi_{ijk}^{(2)}E_jE_k$ is transformed into a matrix (1):

$$\begin{bmatrix} P_x^{(2)} \\ P_y^{(2)} \\ P_z^{(2)} \end{bmatrix} = \varepsilon_0 \begin{pmatrix} \chi_{xxx}^{(2)} & \chi_{xyy}^{(2)} & \chi_{xzz}^{(2)} & \chi_{xyz}^{(2)} & \chi_{xzx}^{(2)} & \chi_{xxy}^{(2)} \\ \chi_{yxx}^{(2)} & \chi_{yyy}^{(2)} & \chi_{yzz}^{(2)} & \chi_{yyz}^{(2)} & \chi_{yzx}^{(2)} & \chi_{yxy}^{(2)} \\ \chi_{zxx}^{(2)} & \chi_{zyy}^{(2)} & \chi_{zzz}^{(2)} & \chi_{zyz}^{(2)} & \chi_{zzx}^{(2)} & \chi_{zxy}^{(2)} \end{pmatrix} \begin{bmatrix} E_xE_x \\ E_yE_y \\ E_zE_z \\ 2E_yE_z \\ 2E_zE_x \\ 2E_xE_y \end{bmatrix}$$

wherein, x, y, z respectively correspond to the Cartesian coordinate components i, j, k in the Cartesian coordinate system; $\chi_{zxx}^{(2)}$, $\chi_{zyy}^{(2)}$, $\chi_{zzz}^{(2)}$, $\chi_{zyz}^{(2)}$, $\chi_{zzx}^{(2)}$, $\chi_{zxy}^{(2)}$, $\chi_{yxx}^{(2)}$, $\chi_{yyy}^{(2)}$, $\chi_{yzz}^{(2)}$, $\chi_{yyz}^{(2)}$, $\chi_{yzx}^{(2)}$, $\chi_{yxy}^{(2)}$, $\chi_{xxx}^{(2)}$, $\chi_{xyy}^{(2)}$, $\chi_{xzz}^{(2)}$, $\chi_{xyz}^{(2)}$, $\chi_{xzx}^{(2)}$, $\chi_{xxy}^{(2)}$ are eighteen independent polarization parameters; $P_x^{(2)}$ is an x-component of the second-order nonlinear polarization intensity, which determines a generation of an x-polarization component of the frequency-doubled light; $P_y^{(2)}$ is a y-component of the second-order nonlinear polarization intensity, which determines a generation of a y-polarization component of the frequency-doubled light; $P_z^{(2)}$ is a z-component of the second-order nonlinear polarization intensity, which determines a generation of a z-polarization component of the frequency-doubled light; $E_x$ is an x-polarization component of the fundamental frequency, $E_y$ is a y-polarization component of the fundamental frequency, $E_z$ is a z-polarization component of the fundamental frequency.

12. The method according to claim 11, wherein, the cut direction of the sample to be tested is the x-cut direction, the thickness direction of the sample to be tested is an x-direction, a direction of light propagation is the x-direction, a y-direction and a z-direction are polarization directions; and the S300 comprises:

S310: when only the y-polarization component of the fundamental frequency light is incident, setting experimental values of susceptibility trial solutions $\chi_{yyy}^{(2)}$ and $\chi_{zyy}^{(2)}$; inputting the following parameters into the optical parameter simulation calculation module:

the thickness of the sample to be tested, the experimental value of the light intensity of the fundamental frequency light employed in each set of optical tests, the experimental value of the light intensity of the frequency-doubled light obtained in each set of optical tests, the experimental value of the polarization azimuth angle of the frequency-doubled light obtained in each set of optical tests, the experimental value of the ellipticity angle of the frequency-doubled light obtained in each set of optical tests, and the experimental values of the susceptibility trial solutions $\chi_{yyy}^{(2)}$ and $\chi_{zyy}^{(2)}$;

S320: when only the z-polarization component of the fundamental frequency light is incident, setting experimental values of susceptibility trial solutions $\chi_{yzz}^{(2)}$ and $\chi_{zzz}^{(2)}$; inputting the following parameters to the optical parameter simulation calculation module:

the thickness of the sample to be tested, the experimental value of the light intensity of the fundamental frequency light employed in each set of optical tests, the experimental value of the light intensity of the frequency-doubled light obtained in each set of optical tests, the experimental value of the polarization azimuth angle of the frequency-doubled light obtained in each set of optical tests, the experimental value of the ellipticity angle of the frequency-doubled light obtained in each set of optical tests, and the experimental values of the susceptibility trial solutions $\chi_{yyy}^{(2)}$ and $\chi_{zyy}^{(2)}$;

S330: when the fundamental frequency light has both the y-polarization component and the z-polarization component, setting experimental values of susceptibility trial solutions $\chi_{yyz}^{(2)}$ and $\chi_{zyz}^{(2)}$; inputting the following parameters to the optical parameter simulation calculation module:

the thickness of the sample to be tested, the experimental value of the light intensity of the fundamental frequency light employed in each set of optical tests, the experimental value of the light intensity of the frequency-doubled light obtained in each set of optical tests, the experimental value of the polarization azimuth angle of the frequency-doubled light obtained in each set of optical tests, the experimental value of the ellipticity angle of the frequency-doubled light obtained in each set of optical tests, and the experimental values of the susceptibility trial solutions $\chi_{yyz}^{(2)}$ and $\chi_{zyz}^{(2)}$; the S400 comprises:

S410: obtaining a fitting curve of the second-order nonlinear susceptibilities $\chi_{yyy}^{(2)}$ and $\chi_{zyy}^{(2)}$ of the material through the S310;

S420: obtaining a fitting curve of the second-order nonlinear susceptibilities $\chi_{yzz}^{(2)}$ and $\chi_{zzz}^{(2)}$ of the material through the S320;

S430: obtaining a fitting curve of the second-order nonlinear susceptibilities $\chi_{yyz}^{(2)}$ and $\chi_{zyz}^{(2)}$ of the material through the S330;

S440: obtaining ratio relationships among the polarization parameters $\chi_{yzz}^{(2)}$, $\chi_{zzz}^{(2)}$, $\chi_{yzz}^{(2)}$, $\chi_{zzz}^{(2)}$, $\chi_{yyz}^{(2)}$ and $\chi_{zyz}^{(2)}$ and phase relationships among the polarization parameters $\chi_{yzz}^{(2)}$, $\chi_{zzz}^{(2)}$, $\chi_{yzz}^{(2)}$, $\chi_{zzz}^{(2)}$, $\chi_{yyz}^{(2)}$ and $\chi_{zyz}^{(2)}$ of the sample to be tested cut in the x-direction according obtained fitting curves of the second-order nonlinear susceptibilities of the material in the S410 to S430.

13. The method according to claim 11, wherein, the cut direction of the sample to be tested is a y-cut direction, the thickness direction of the sample to be tested is the y-direction, the direction of the light propagation is the y-direction, and the x-direction and the z-direction are the polarization directions; the S300 comprises:

S311: when only the x-polarization component of the fundamental frequency light is incident, setting experimental values of susceptibility trial solutions $\chi_{xxx}^{(2)}$ and $\chi_{zxx}^{(2)}$; inputting the following parameters to the optical parameter simulation calculation module:

the thickness of the sample to be tested, the experimental value of the light intensity of the fundamental frequency light employed in each set of optical tests, the experimental value of the light intensity of the frequency-doubled light obtained in each set of optical tests, the experimental value of the polarization azimuth angle of the frequency-doubled light obtained in each set of optical tests, the experimental value of the ellipticity angle of the frequency-doubled light obtained in each set of optical tests, and the experimental values of the susceptibility trial solutions $\chi_{xxx}^{(2)}$ and $\chi_{zxx}^{(2)}$;

S321: when only the z-polarization component of the fundamental frequency light is incident, setting experimental values of susceptibility trial solutions $\chi_{xzz}^{(2)}$ and $\chi_{zzz}^{(2)}$; inputting the following parameters to the optical parameter simulation calculation module:

the thickness of the sample to be tested, the experimental value of the light intensity of the fundamental frequency light employed in each set of optical tests, the experimental value of the light intensity of the frequency-doubled light obtained in each set of optical tests, the experimental value of the polarization azimuth angle of the frequency-doubled light obtained in each set of optical tests, the experimental value of the ellipticity angle of the frequency-doubled light obtained in each set of optical tests, and the experimental values of the susceptibility trial solutions $\chi_{xzz}^{(2)}$ and $\chi_{zzz}^{(2)}$;

S331: when the fundamental frequency light has both the x-polarization component and the z-polarization component, setting experimental values of susceptibility trial solutions $\chi_{xzx}^{(2)}$ and $\chi_{zzx}^{(2)}$; inputting the following parameters to the optical parameter simulation calculation module:

the thickness of the sample to be tested, the experimental value of the light intensity of the fundamental frequency light employed in each set of optical tests, the experimental value of the light intensity of the frequency-doubled light obtained in each set of optical tests, the experimental value of the polarization azimuth angle of the frequency-doubled light obtained in each set of optical tests, the experimental value of the ellipticity angle of the frequency-doubled light obtained in each set of optical tests, and the experimental values of the susceptibility trial solutions $\chi_{xzx}^{(2)}$ and $\chi_{zzx}^{(2)}$;

the S400 comprises:

S411: obtaining a fitting curve of the second-order nonlinear susceptibilities $\chi_{xxx}^{(2)}$ and $\chi_{zxx}^{(2)}$ of the material through the S311;

S421: obtaining a fitting curve of the second-order nonlinear susceptibilities $\chi_{xzz}^{(2)}$ and $\chi_{zzz}^{(2)}$ of the material through the S321;

S431: obtaining a fitting curve of the second-order nonlinear susceptibilities $\chi_{xzx}^{(2)}$ and $\chi_{zzx}^{(2)}$ of the material through the S331;

S441: obtaining ratio relationships among the polarization parameters $\chi_{xxx}^{(2)}$, $\chi_{zxx}^{(2)}$, $\chi_{xzz}^{(2)}$, $\chi_{zzz}^{(2)}$, $\chi_{xzx}^{(2)}$ and $\chi_{zzx}^{(2)}$ and phase relationships among the polarization parameters $\chi_{xxx}^{(2)}$, $\chi_{zxx}^{(2)}$, $\chi_{xzz}^{(2)}$, $\chi_{zzz}^{(2)}$, $\chi_{xzx}^{(2)}$ and $\chi_{zzx}^{(2)}$ of the sample to be tested cut in the x-direction according to the obtained fitting curves of the second-order nonlinear susceptibilities of the material in the S411 to S431.

14. The method according to claim 11, wherein, the cut direction of the sample to be tested is a z-cut direction, the thickness direction of the sample to be tested is the z-direction, the direction of the light propagation direction is the z-direction, and the x-direction and the z-direction are the polarization directions; the S300 comprises:

S311a: when only the x-polarization component of the fundamental frequency light is incident, setting experimental values of susceptibility trial solutions $\chi_{xxx}^{(2)}$ and $\chi_{yxx}^{(2)}$; inputting the following parameters to the optical parameter simulation calculation module:

the thickness of the sample to be tested, the experimental value of the light intensity of the fundamental frequency light employed in each set of optical tests, the experimental value of the light intensity of the frequency-doubled light obtained in each set of optical tests, the experimental value of the polarization azimuth angle of the frequency-doubled light obtained in each set of optical tests, the experimental value of the ellipticity angle of the frequency-doubled light obtained in each set of optical tests, and the experimental values of the susceptibility trial solutions $\chi_{xxx}^{(2)}$ and $\chi_{yxx}^{(2)}$;

S321a: when only the y-polarization component of the fundamental frequency light is incident, setting experimental values of susceptibility trial solutions $\chi_{xyy}^{(2)}$ and $\chi_{yyy}^{(2)}$; inputting the following parameters to the optical parameter simulation calculation module:

the thickness of the sample to be tested, the experimental value of the light intensity of the fundamental frequency light employed in each set of optical tests, the experimental value of the light intensity of the frequency-doubled light obtained in each set of optical tests, the experimental value of the polarization azimuth angle of the frequency-doubled light obtained in each set of optical tests, the experimental value of the ellipticity angle of the frequency-doubled light obtained in each set of optical tests, and the experimental values of the susceptibility trial solutions $\chi_{xyy}^{(2)}$ and $\chi_{yyy}^{(2)}$;

S331a: when the fundamental frequency light has both the x-polarization component and the y-polarization component, setting experimental values of susceptibility trial solutions $\chi_{xxy}^{(2)}$ and $\chi_{yxy}^{(2)}$; inputting the following parameters to the optical parameter simulation calculation module:

the thickness of the sample to be tested, the experimental value of the light intensity of the fundamental frequency light employed in each set of optical tests, the experimental value of the light intensity of the frequency-doubled light obtained in each set of optical tests, the experimental value of the polarization azimuth angle of the frequency-doubled light obtained in each set of optical tests, the experimental value of the ellipticity angle of the frequency-doubled light obtained in each set of optical tests, and the experimental values of the susceptibility trial solutions $\chi_{xxy}^{(2)}$ and $\chi_{yxy}^{(2)}$;

the S400 comprises:

S411a: obtaining a fitting curve of the second-order nonlinear susceptibilities $\chi_{xxx}^{(2)}$ and $\chi_{yxx}^{(2)}$ of the material through the S311a;

S421a: obtaining a fitting curve of the second-order nonlinear susceptibilities $\chi_{xyy}^{(2)}$ and $\chi_{yyy}^{(2)}$ of the material through the S321a;

S431a: obtaining a fitting curve of the second-order nonlinear susceptibilities $\chi_{xxy}^{(2)}$ and $\chi_{yxy}^{(2)}$ of the material through the S331a;

S441a: obtaining ratio relationships among the polarization parameters $\chi_{xxx}^{(2)}$, $\chi_{yxx}^{(2)}$, $\chi_{xyy}^{(2)}$, $\chi_{yyy}^{(2)}$, $\chi_{xxy}^{(2)}$ and $\chi_{yxy}^{(2)}$ and phase relationships among the polarization parameters $\chi_{xxx}^{(2)}$, $\chi_{yxx}^{(2)}$, $\chi_{xyy}^{(2)}$, $\chi_{yyy}^{(2)}$, $\chi_{xxy}^{(2)}$ and $\chi_{yxy}^{(2)}$ of the sample to be tested cut in the x-direction according to the obtained fitting curves of the second-order nonlinear susceptibilities of the material in the S411a to S431a.

* * * * *